(12) United States Patent
Lee et al.

(10) Patent No.: US 10,192,092 B2
(45) Date of Patent: Jan. 29, 2019

(54) HIGH-EFFICIENCY FINGERPRINT IDENTIFICATION DEVICE

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 97 days.

(21) Appl. No.: 15/412,836

(22) Filed: Jan. 23, 2017

(65) Prior Publication Data

US 2017/0228572 A1 Aug. 10, 2017

(30) Foreign Application Priority Data

Feb. 4, 2016 (TW) .............................. 105103648 A

(51) Int. Cl.
*G06K 9/00* (2006.01)

(52) U.S. Cl.
CPC ....... *G06K 9/0002* (2013.01); *G06K 9/00053* (2013.01); *G06K 9/00087* (2013.01)

(58) Field of Classification Search
CPC ............. G06K 9/0002; G06K 9/00053; G06K 9/00087; G06K 9/00067; G06K 9/00026; G06K 9/00013; G06K 9/00892; G06K 9/38; G06F 3/0416; G06F 3/044; G06F 2203/04103; G06F 3/0412; G06F 3/041; G06F 2203/04104; G06F 2203/04808; G06F 3/04883; G06F 2203/04105; G06F 2203/04101; G06F 3/0414; G06F 2203/04106; G06F 2203/04108;

(Continued)

(56) References Cited

U.S. PATENT DOCUMENTS 6,060,756 A * 5/2000 Machida ................ G01B 7/004
257/414
6,438,257 B1 * 8/2002 Morimura .......... G01R 27/2605
382/108

(Continued)

FOREIGN PATENT DOCUMENTS

| TW | M493114 U | 1/2015 |
| TW | M509379 U | 9/2015 |
| TW | M509384 U | 9/2015 |

*Primary Examiner* — Aklilu K Woldemariam
(74) *Attorney, Agent, or Firm* — Muncy, Geissler, Olds & Lowe, P.C.

(57) ABSTRACT

A high-efficiency fingerprint identification device includes an electrode substrate, plural 1-to-N switch circuits formed on the electrode substrate, plural sensing electrodes and plural wires. Each 1-to-N switch circuit has one first end, N second ends and m control ends. The m control ends control connection between the N second ends and the first end. Each sensing electrode corresponds to a nearby 1-to-N switch circuit. The wires are divided into sensing and driving lines and control lines. The sensing electrodes in each column correspond to a sensing and driving line. The sensing and driving line is connected to one of the N second ends of the 1-to-N switch circuits in the column. The sensing electrodes in each row correspond to m control lines. Each control line is connected to ones of the m control ends of the 1-to-N switch circuits in the row.

23 Claims, 19 Drawing Sheets

(58) Field of Classification Search
CPC .. G06F 2203/04111; G06F 2203/04112; G06F 3/0418; G02F 1/13338; G02F 1/134336; G02F 1/136286; G02F 1/1368; G02F 2001/134345; G02F 2001/134372; G02F 2201/121; G02F 2201/123; G02F 1/1345; G02F 1/13452; G02F 1/136227; G02F 2001/13613; G02F 2201/42; G02F 2001/13312; G02F 1/133528; G02F 1/136213; G02F 2001/133565; G02F 1/133512; G02F 1/13318; G02F 1/133514; G02F 1/13394; G02F 2001/133302; H04M 1/725; G01B 7/004; G01B 7/34; G01R 27/2605; G11C 11/24; G11C 27/028; H01L 27/3244; H01L 27/3281
USPC .......... 382/108, 124, 125; 345/87, 205, 211
See application file for complete search history.

(56) References Cited

U.S. PATENT DOCUMENTS

| | | | |
|---|---|---|---|
| 9,405,408 B2* | 8/2016 | Peng | G06F 3/044 |
| 2003/0179169 A1* | 9/2003 | Izumi | G02F 1/1345 345/87 |
| 2004/0096061 A1* | 5/2004 | Yano | G06K 9/0002 380/59 |
| 2006/0034492 A1* | 2/2006 | Siegel | G06F 1/1601 382/115 |
| 2007/0109239 A1* | 5/2007 | den Boer | G02F 1/13338 345/87 |
| 2012/0092350 A1* | 4/2012 | Ganapathi | G02B 26/0833 345/501 |
| 2013/0120260 A1* | 5/2013 | Piot | G06F 3/03541 345/163 |
| 2013/0279769 A1* | 10/2013 | Benkley, III | G06K 9/00013 382/124 |
| 2015/0177884 A1* | 6/2015 | Han | G06F 3/044 345/174 |
| 2016/0055363 A1* | 2/2016 | Lee | G06K 9/0002 382/124 |
| 2017/0006223 A1* | 1/2017 | Hargreaves | G06K 9/38 |
| 2017/0017340 A1* | 1/2017 | Liu | G06F 3/0416 |
| 2017/0038866 A1* | 2/2017 | Akhavan Fomani | G06F 3/044 |
| 2017/0206394 A1* | 7/2017 | Chiang | G06K 9/0002 |
| 2017/0228574 A1* | 8/2017 | Benkley, III | G06K 9/0002 |
| 2017/0308228 A1* | 10/2017 | Benkley, III | G06K 9/00013 |
| 2018/0138283 A1* | 5/2018 | Kimura | H01L 27/1225 |

* cited by examiner

HIGH-EFFICIENCY FINGERPRINT IDENTIFICATION DEVICE

BACKGROUND OF THE INVENTION

1. Field of the Invention

The present invention relates to a sensing device and, more particularly, to a high-efficiency fingerprint identification device.

2. Description of Related Art

The development of electronic commerce promotes the progress of remote payment, in which there is demand for biometrics identification. The technology of biometrics identification includes fingerprint identification, iris identification, DNA identification, and so on. Considering the requirement for efficiency, safety and non-invasion, the fingerprint identification becomes the primary technology in biometrics identification. The fingerprint identification further includes optical type, thermal type, ultrasonic type and capacitance type, wherein the capacitance type stands out in this field by its small size, low cost, power saving, stability and anti-fake function.

The prior capacitance type fingerprint identification technology includes swipe type and touch type, wherein the touch type stands out by its accuracy, efficiency and convenience. However, since the sensing signals are weak and the surrounding noise signals are strong, the touch type fingerprint identification usually integrates the sensing electrodes with the sensing circuits into an integrated circuit chip. In order to prevent the prior fingerprint identification chip from being damaged when packaging, the output wires are protected by a sealant, which separates the sensing electrodes from the fingers by a distance of tens of micrometers (μm), and thus seriously influences the accuracy. Alternatively, the sealant can be replaced by a sapphire film with high dielectric constant, which is however very expensive. Since the distance of tens of micrometers is disadvantageous for product integration, a common method to deal with the problem is to form an opening on the protection glass, and then to embed the fingerprint identification chip into the opening in a complicated way to form a button. This increases the cost of materials and the cost of package manufacturing, and the yield factor, the lifetime and the tolerance of the product are undesirable. Hence, the industry keeps making efforts in improving the sensing sensitivity and the signal to noise ratio, in order to increase the sensing distance between the sensing electrodes and the fingerprint, for simplifying the package of the sensing integrated circuit. It is expected to significantly decrease the cost and increase the lifetime and the tolerance of the product. Therefore, the fingerprint identification technology is desired to be improved.

SUMMARY OF THE INVENTION

The object of the present invention is to provide a high-efficiency fingerprint identification device, which uses a plurality of control lines and a plurality of signal selection switch circuits to sequentially or dynamically select at least one electrode as a sensing region from a plurality of sensing electrodes in each electrode sensing region, so as to configure the sensing electrodes surrounding the sensing region to be a corresponding deflection focusing region, and configure the sensing electrodes surrounding the deflection focusing region to be a corresponding convergence stabilizing region, thereby gathering and pulling up the electric flux lines from the sensing electrodes in the sensing region. Thus, it can enhance the sensing sensitivity, stability and accuracy, increase the sensing distance, improve the signal-noise ratio, and reduce the cost of fingerprint identification device.

According to one feature of the present invention, there is provided a high-efficiency fingerprint identification device, which includes a sensing electrode substrate, a plurality of 1-to-N switch circuits, a plurality of sensing electrode and a plurality of wires. The 1-to-N switch circuits are formed on the sensing electrode substrate. Each 1-to-N switch circuit has a first end, N second ends and m control ends. The m control ends controls the connection between the first end and the N second ends, where m and N are each an integer greater than 1. The sensing electrodes are arranged along a first direction and a second direction for forming an electrode matrix with columns and rows. The first direction is substantially perpendicular to the second direction, wherein each sensing electrode is corresponding to a nearby 1-to-N switch circuit, the i-th second ends of the 1-to-N switch circuits corresponding to the sensing electrodes in each column are electrically connected to each other, one of the N second ends is electrically connected to its corresponding sensing electrode, where $1 \leq i \leq N$. The wires are divided into driving and sensing lines and control lines, wherein the sensing electrodes in each column are corresponding to at least one driving and sensing line, the at least one driving and sensing line is electrically connected to one of the N second ends of the 1-to-N switch circuits corresponding to the sensing electrodes in the column, the sensing electrodes in each row are corresponding to m control lines, and each control line is electrically connected to ones of the m control ends of the 1-to-N switch circuits corresponding to the sensing electrodes in the row.

According to another feature of the present invention, there is provided a high-efficiency fingerprint identification device, which includes a sensing electrode substrate and at least two sensing electrode regions on the sensing electrode substrate. Each sensing electrode region includes a plurality of 1-to-N switch circuits, a plurality of sensing electrodes, and a plurality of wires. The 1-to-N switch circuits are formed on the sensing electrode substrate. Each 1-to-N switch circuit has a first end, N second ends and m control ends. The m control ends control the connection between the first end and the N second ends, wherein m and N are each an integer greater than 1. The sensing electrodes are arranged along a first direction and a second direction for forming an electrode matrix with columns and rows. The first direction is substantially perpendicular to the second direction, wherein each sensing electrode is corresponding to a nearby 1-to-N switch circuit, the i-th second ends of the 1-to-N switch circuits corresponding to the sensing electrodes in each column are electrically connected to each other, one of the N second ends is electrically connected to its corresponding sensing electrode, where $1 \leq i \leq N$. The wires are divided into driving and sensing lines and control lines passing through the sensing electrodes in each row and the sensing electrodes in each column, respectively, in each sensing electrode region, wherein the sensing electrodes in each column are corresponding to at least one driving and sensing line, the at least one driving and sensing line is electrically connected to one the N second ends of the 1-to-N switch circuits corresponding to the sensing electrodes in the column, the sensing electrodes in each row are corresponding to m control lines, and each control line is electrically connected to ones of the m control ends of the 1-to-N switch circuits corresponding to the sensing electrode in the row.

DETAILED DESCRIPTION OF THE PREFERRED EMBODIMENT

Figure 1:
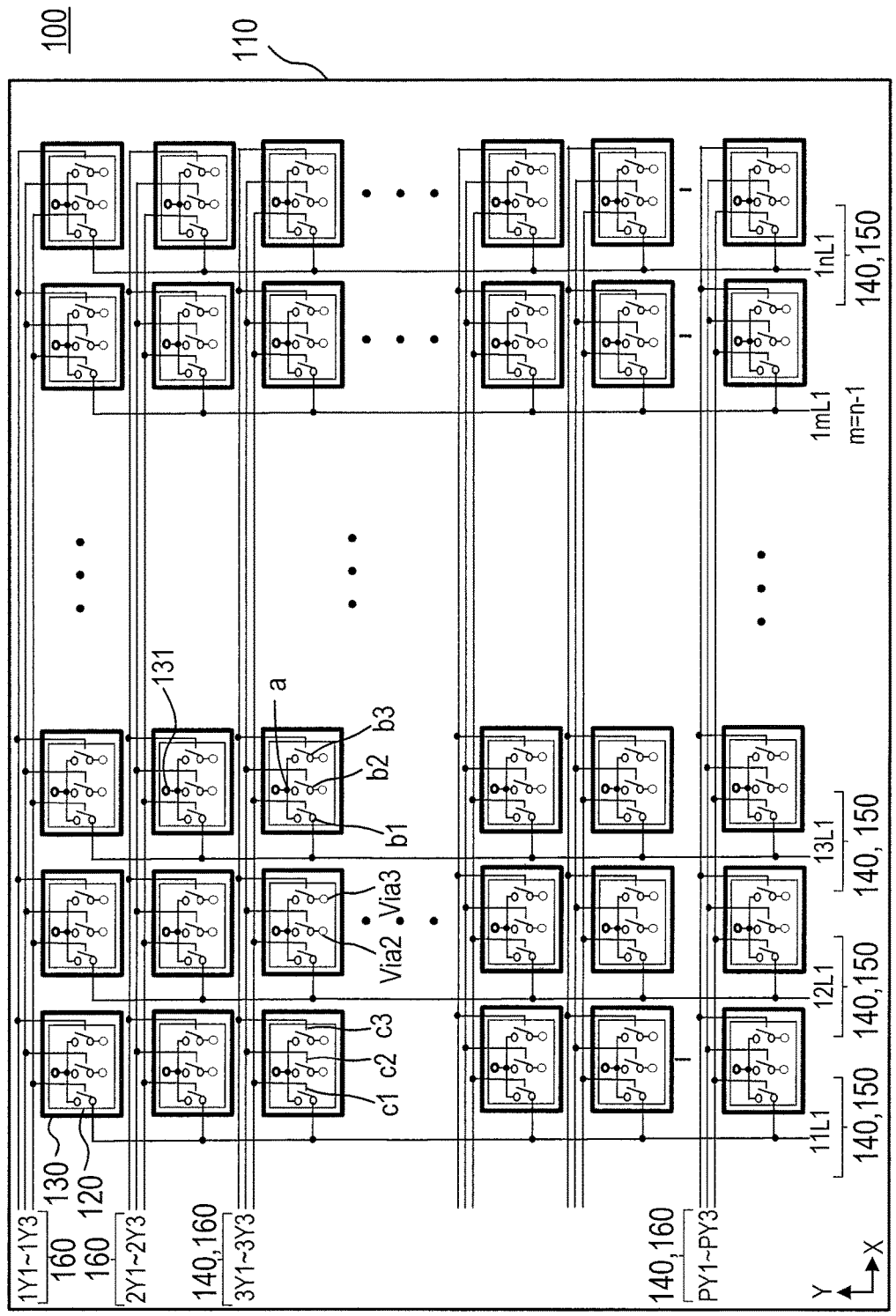
FIG. 1 is the top view of a high-efficiency fingerprint identification device according to the present invention.

FIG. 1 is the top view of a high-efficiency fingerprint identification device 100 according to the present invention. As shown in FIG. 1, the high-efficiency fingerprint identification device 100 includes a sensing electrode substrate 110, a plurality of 1-to-N switch circuits 120, a plurality of sensing electrodes 130, a plurality of wires 140 (which are divided into driving and sensing lines 150 and control lines 160), and an integrated circuit chip 170 (shown in FIG. 5).

The sensing electrode substrate 110 can be a polymer film substrate, a glass substrate, a sapphire substrate, a ceramic substrate or a metal substrate.

The 1-to-N switch circuits 120 are formed on the sensing electrode substrate 110. The 1-to-N switch circuits 120 are preferably thin film transistor circuits. Each 1-to-N switch circuit 120 has a first end (a), N second nodes (b) and m control nodes (c). The m control ends (c) control the connection between the first end (a) and the N second ends (b), wherein m and N are each an integer larger than 1. In this embodiment, each 1-to-N switch circuit 120 is a 1-to-3 switch circuit, which has a first end (a), three second nodes (b1), (b2), (b3) and three control nodes (c1), (c2), (c3).

The sensing electrodes 130 are arranged along a first direction (Y-axis direction) and a second direction (X-axis direction) to form an electrode matrix with columns and rows. The first direction is substantially perpendicular to the second direction. Each sensing electrode 130 is corresponding to a nearby 1-to-N switch circuit 120. The i-th second ends of the 1-to-N switch circuits 120 corresponding to the sensing electrodes 130 in each column are electrically connected to each other. One of the N second ends is electrically connected to a corresponding sensing electrode 130 through the first end, where $1 \leq i \leq N$. That is, the 1-st second ends (b1) of the 1-to-N switch circuits 120 in the same column are electrically connected to each other, the 2-nd second ends (b2) of the 1-to-N switch circuits 120 in the same column are electrically connected to each other, and the 3-rd second ends (b3) of the 1-to-N switch circuits 120 in the same column are electrically connected to each other, and so on as to the N-th second ends. It is noted that, in this embodiment, N is 3.

The wires 140 are divided into the driving and sensing lines 150 and the control lines 160, wherein the sensing electrodes 130 in each column is corresponding to at least one driving and sensing line 150. In this embodiment, the sensing electrodes 130 in each column are corresponding to one driving and sensing line 150. For example, the sensing electrodes 130 in the first column are corresponding to a driving and sensing line 11L1, the sensing electrodes 130 in the second column are corresponding to a driving and sensing line 12L1, the sensing electrodes 130 in the third column are corresponding to a driving and sensing line 13L1, ..., and the sensing electrodes 130 in the n-th column are corresponding to a driving and sensing line 1nL1. Each driving and sensing line 150 is electrically connected to one of the N second ends of the 1-to-N switch circuits 120 corresponding to the sensing electrodes 130 in the column. For example, the driving and sensing line 11L1 is electrically connected to the 1-st second ends (b1) of the 1-to-3 switch circuits 120 corresponding to the sensing electrodes 130 in the first column. The 2-nd second ends (b2) of the 1-to-3 switch circuits 120 are connected to a first shielding electrode layer 740 (shown in FIG. 8A) through via holes (via2). The 3-rd second ends (b3) of the 1-to-3 switch circuits 120 are connected to a second shielding electrode layer 750 (shown in FIG. 8C) through via holes (via3). In other embodiments, the 2-nd second ends (b2) of the 1-to-3 switch circuits 120 can be connected to another electrical signal, such as a first common voltage (Vcom1 or Vref1), through the via holes (via2). Similarly, the 3-rd second ends (b3) of the 1-to-3 switch circuits 120 can be connected to another electrical signal, such as a second common voltage (Vcom2 or Vref2), through the via holes (via3).

Figure 2:
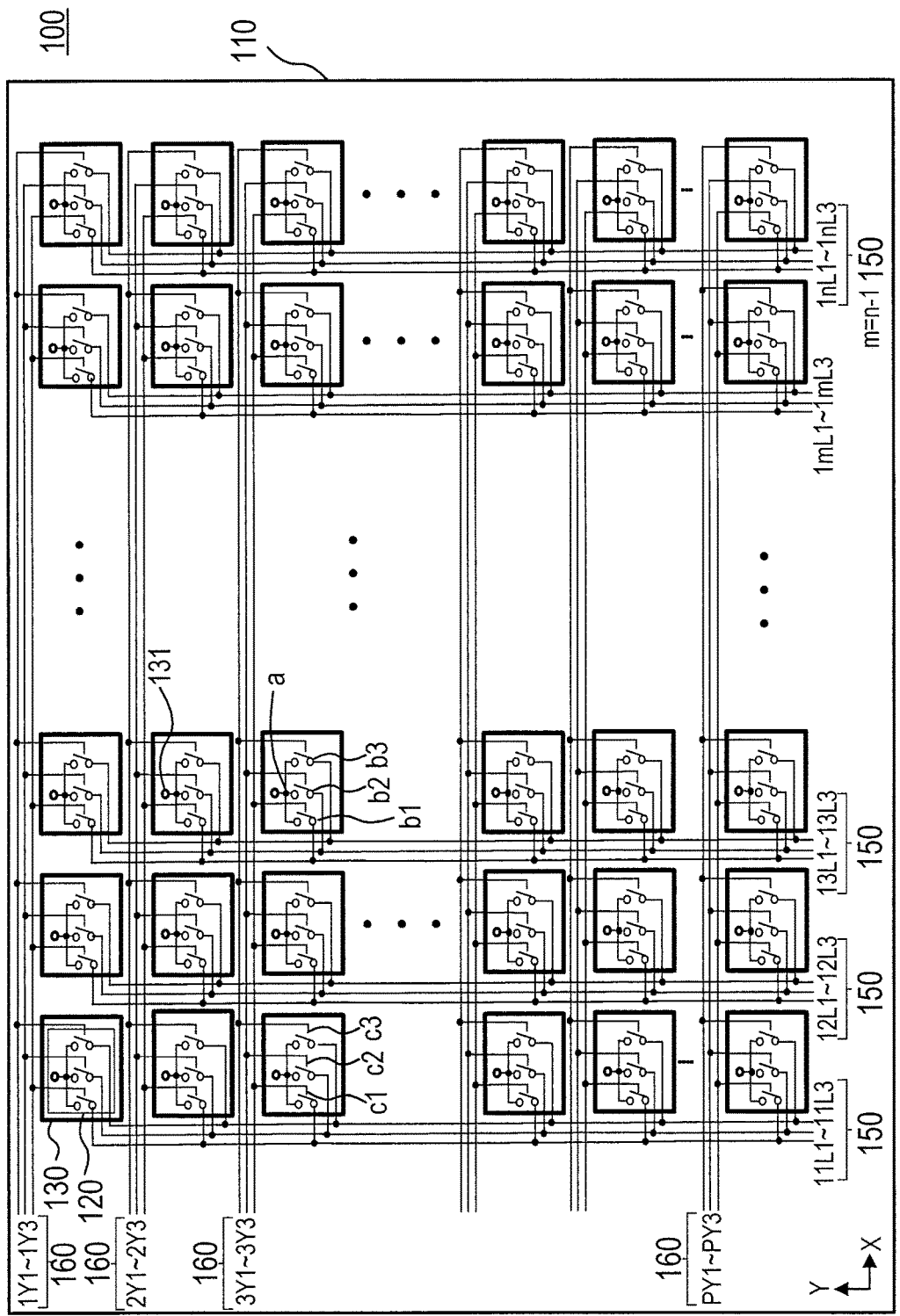
FIG. 2 is the top view of another high-efficiency fingerprint identification device according to the present invention.

FIG. 2 is the top view of another high-efficiency fingerprint identification device 100 according to the present invention, which is similar to FIG. 1 except that the at least one driving and sensing line 150 in FIG. 1 becomes three driving and sensing lines 150 in FIG. 2. For example, the sensing electrodes 130 in the first column are corresponding to three driving and sensing lines 11L1 to 11L3, the sensing electrodes 130 in the second column are corresponding to three driving and sensing lines 12L1 to 12L3, the sensing electrodes 130 in the third column are corresponding to three driving and sensing lines 13L1 to 13L3, . . . , and the sensing electrodes 130 in the n-th column are corresponding to three driving and sensing lines 1nL1 to 1nL3. Each driving and sensing line is electrically connected to one of the N second ends of the 1-to-N switch circuits 120 corresponding to the sensing electrodes 130 in the column. For example, the driving and sensing line 11L1 is electrically connected to the 1-st second ends (b1) of the 1-to-3 switch circuits 120 corresponding to the sensing electrodes 130 in the first column. The driving and sensing line 11L2 is electrically connected to the 2-nd second ends of the 1-to-3 switch circuits 120 corresponding to the sensing electrodes 130 in the first column. The driving and sensing line 11L3 is electrically connected to the 3-rd second ends (b3) of the 1-to-3 switch circuits 120 corresponding to the sensing electrodes 130 in the first column. The driving and sensing line 1nL3 is electrically connected to the 3-rd second ends (b3) of the 1-to-3 switch circuits 120 corresponding to the sensing electrodes 130 in the N-th column.

The sensing electrodes 130 in each row are corresponding to m control lines 160. In this embodiment, the sensing electrodes 130 in each row are corresponding to three control lines 160. For example, the sensing electrodes 130 in the first row are corresponding to three control lines 1Y1 to 1Y3, the sensing electrodes 130 in the second row are corresponding to three control lines 2Y1 to 2Y3, . . . , and the sensing electrodes 130 in the P-th row is corresponding to three control lines PY1 to PY3. Each control line 160 is electrically connected to ones of the m control ends of the 1-to-N switch circuits 120 corresponding to the sensing electrodes 130 in the row. For example, the control line 1Y1 is electrically connected to the first control ends (c1) of the 1-to-3 switch circuits 120 corresponding to the sensing electrodes 130 in the first row, the control line 1Y2 is electrically connected to the second control ends (c2) of the 1-to-3 switch circuits 120 corresponding to the sensing electrodes 130 in the first row, and the control line 1Y3 is electrically connected to the third control ends (c3) of the 1-to-3 switch circuits 120 corresponding to the sensing electrodes 130 in the first row. The control line PY1 is electrically connected to the first control ends (c1) of the 1-to-3 switch circuits 120 corresponding to the sensing electrodes 130 in the P-th row. The control line PY2 is electrically connected to the second control ends (c2) of the 1-to-3 switch circuits 120 corresponding to the sensing electrodes 130 in the P-th row, and the control line PY3 is electrically connected to the third control ends (c3) of the 1-to-3 switch circuits 120 corresponding to the sensing electrodes 130 in the P-th row.

In this embodiment, the relation between the control lines 160 and the 1-to-N switch circuits 120 is represented by the one-hot encoding. That is, as shown in FIG. 2, when the 1-to-N switch circuits 120 are each a 1-to-3 switch circuit, which has m=3 control ends, the 1-to-3 switch circuits 120 in the same row are corresponding to three control lines 160.

Figure 3:
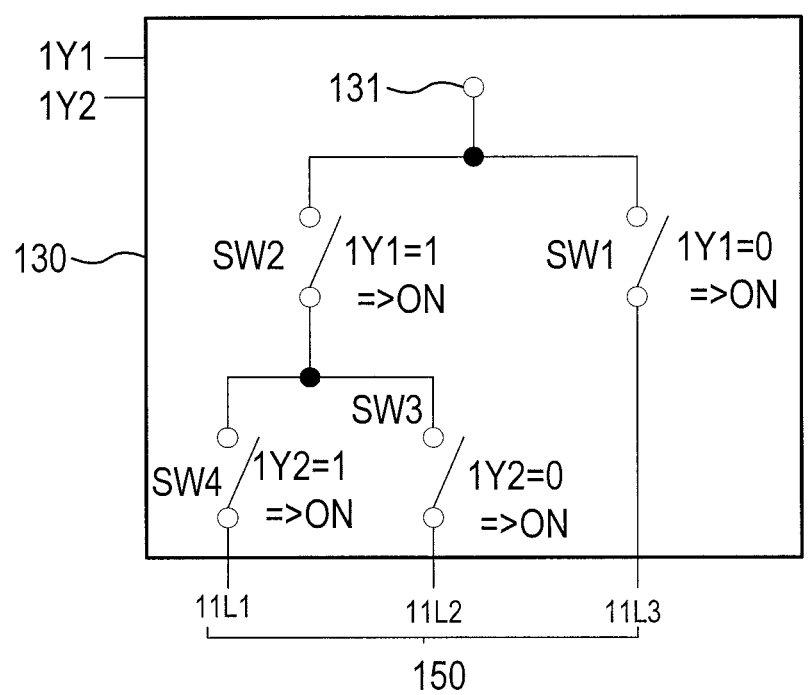
FIG. 3 is the circuit diagram of a 1-to-N switch circuit according to the present invention.

In other embodiments, the relation between the control lines 160 and the 1-to-N switch circuits 120 is represented by the binary encoding. FIG. 3 is the circuit diagram of a 1-to-N switch circuit 120 according to the present invention. FIG. 3 shows another embodiment of a 1-to-3 switch circuit 120 according to the present invention. The 1-to-3 switch circuit 120 has 4 control ends, and they are controlled by two control lines 160 (1Y1, 1Y2). That is, the 1-to-3 switch circuits 120 in the same row are corresponding to two control lines 160.

When the control line 1Y1 is at low voltage (=0), the switch SW1 is turned on, the switch SW2 is turned off, and the driving and sensing line 11L3 is electrically connected to the sensing electrode 130 through the switch SW1 and the via hole 131. When the control line 1Y1 is at high voltage (=1) and the control line 1Y2 is at low voltage (=0), the switch SW1 is turned off, the switches SW2 and SW3 are turned on, and the driving and sensing line 11L2 is electrically connected to the sensing electrode 130 through the switches SW2 and SW3 and the via hole 131.

When the control line 1Y1 is at high voltage (=1) and the control line 1Y2 is at high voltage (=1), the switches SW1 and SW3 are turned off, the switches SW2 and SW4 are turned on, and the driving and sensing line 11L1 is electrically connected to the sensing electrode 130 through the switches SW2 and SW4 and the via hole 131.

Figure 4:
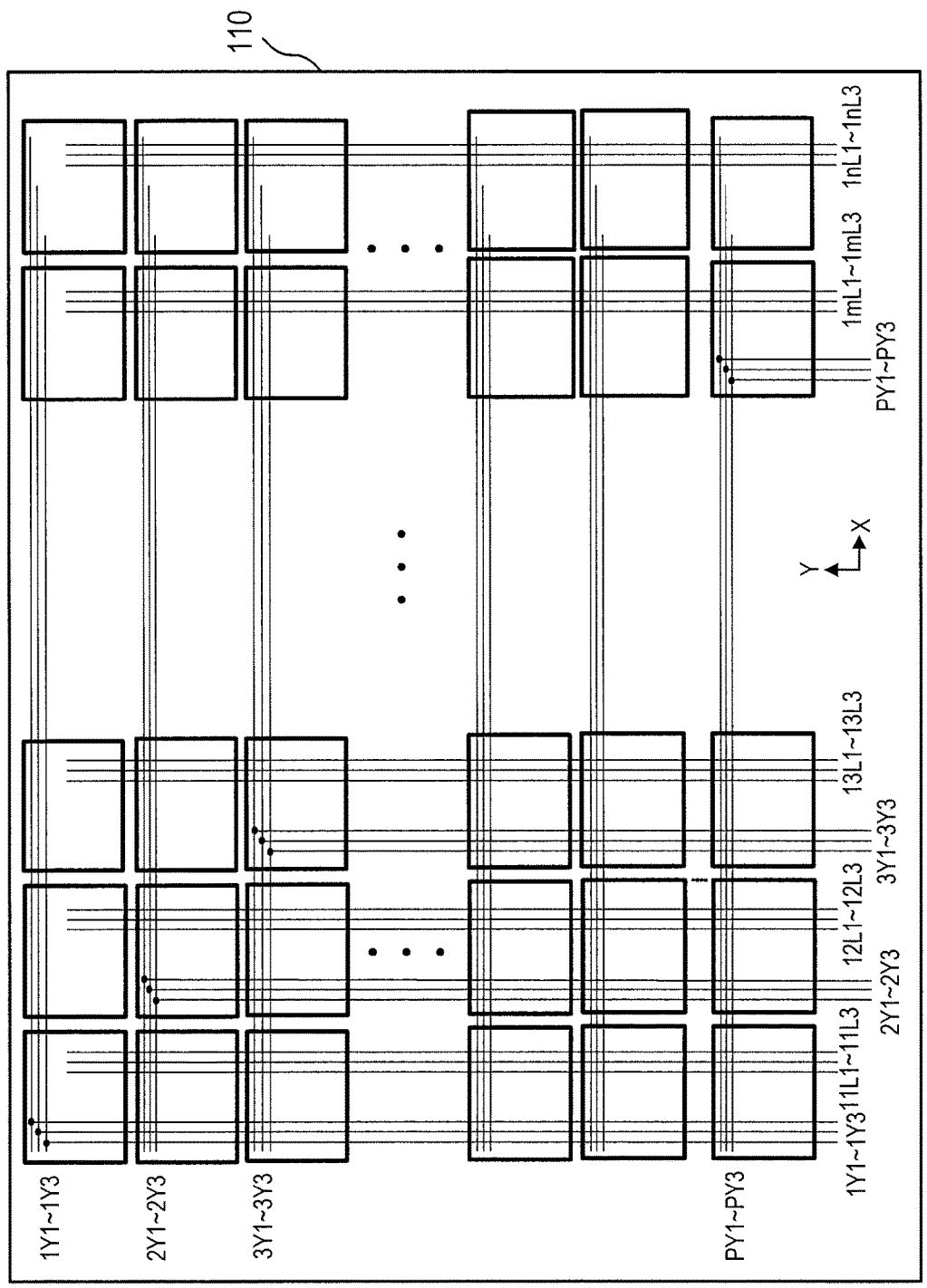
FIG. 4 is the schematic diagram of the control lines and the driving and sensing lines according to the present invention.

FIG. 4 is the schematic diagram of the control lines 160 and the driving and sensing lines 150 according to the present invention. As shown in FIG. 4, the m control lines 160 extend along the first direction until reaching their corresponding rows, and then extend along the second direction. The control lines 1Y1 to 1Y3 are electrically connected to the 1-to-3 switch circuits 120 corresponding to the sensing electrodes 130 in the first row, and thus the control lines 1Y1 to 1Y3 extend along the second direction and extend across the sensing electrodes 130 in the first row.

Figure 5:
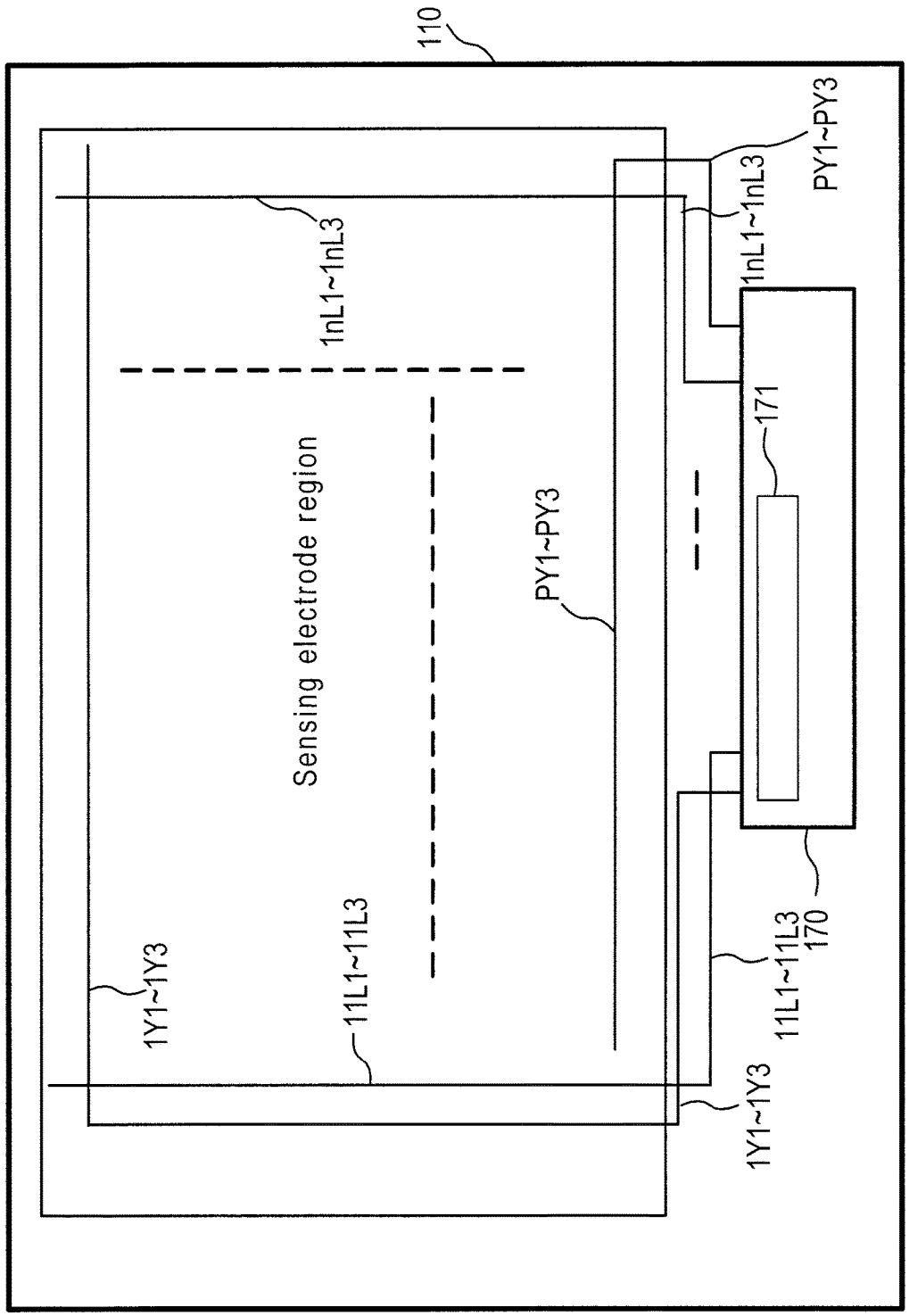
FIG. 5 is the schematic diagram of the high-efficiency fingerprint identification device according to the present invention.
Figure 6:
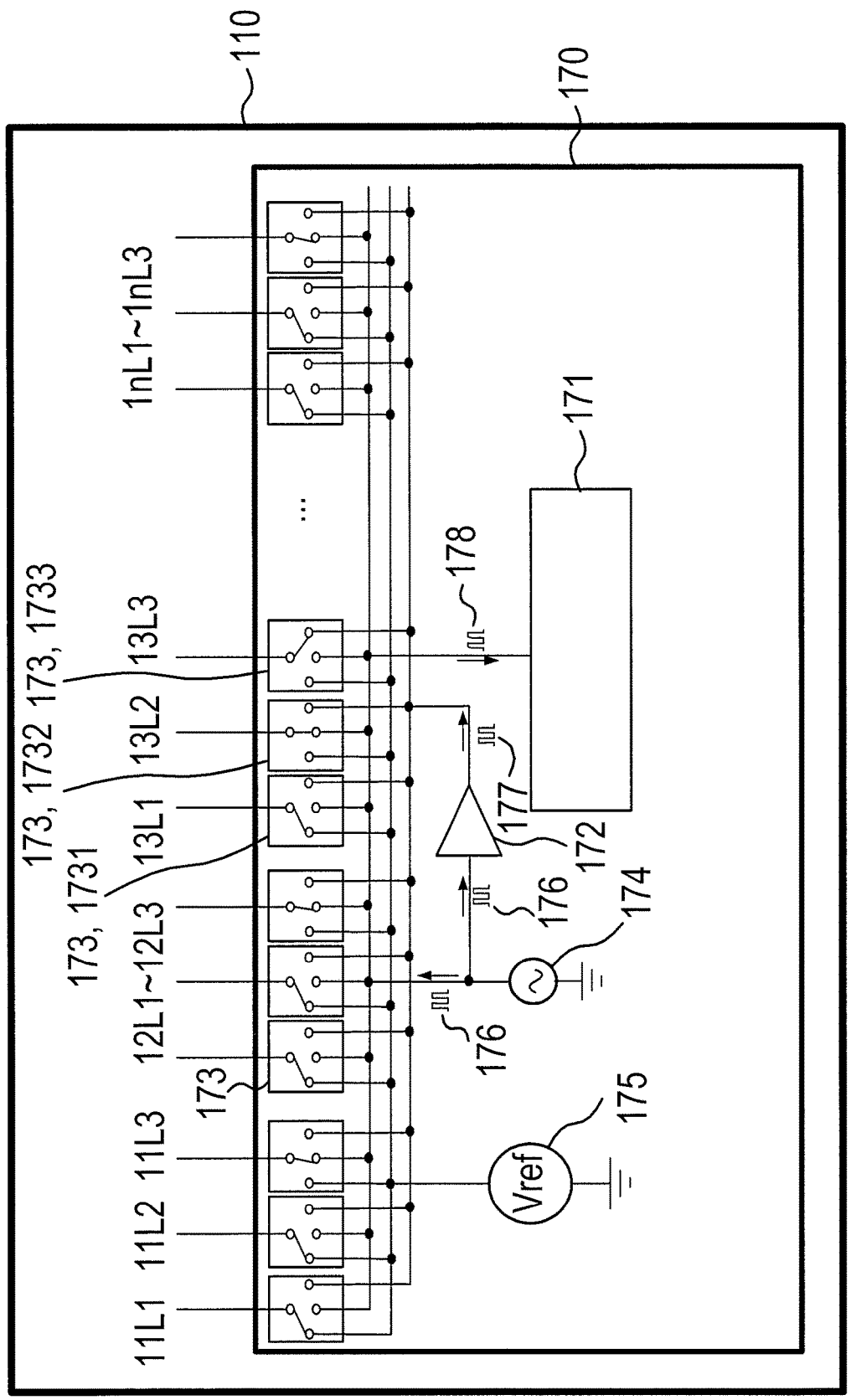
FIG. 6 is the circuit diagram of an integrated circuit chip according to the present invention.

FIG. 5 is the schematic diagram of the high-efficiency fingerprint identification device 100 according to the present invention, in which the integrated circuit chip 170 is adhered on the sensing electrode substrate 110. The integrated circuit chip 170 is electrically connected to the N driving and sensing lines 11L1 to 11L3, 12L1 to 12L3, 13L1 to 13L3, and 1nL1 to 1nL3 and the control lines 1Y1 to 1Y3, 2Y1 to 2Y3, . . . , and PY1 to PY3. FIG. 6 is the circuit diagram of the integrated circuit chip 170 according to the present invention. The integrated circuit chip 170 includes at least one self-capacitance detection circuit 171, at least one amplifier circuit 172 with a gain larger than zero, a plurality of signal selection switch circuits 173, a capacitance detection signal generating circuit 174 and a reference voltage generating circuit 175.

The capacitance detection signal generating circuit 174 generates a capacitance detection signal 176. The capacitance detection signal 176 is amplified through the at least one amplifier circuit 172 with a gain larger than zero, and then becomes an amplified capacitance detection signal 177. The amplifier circuit 172 with a gain larger than zero preferably has a gain of 1. The reference voltage generating circuit 175 generates a reference voltage signal Vref. The reference voltage signal Vref is preferably a direct voltage. Through the selection by the signal selection switch circuits 173, the N relevant capacitance detection signals (the capacitance detection signal 176, the amplified capacitance detection signal 177 and the reference voltage signal Vref) are sent to the N driving and sensing lines 150 (11L1 to 11L3, 12L1 to 12L3, 13L1 to 13L3, . . . , and 1nL1 to 1nL3) corresponding to the sensing electrodes 130 in each column. As shown in FIG. 6, through the selection by signal selection switch circuit 1731, the reference voltage signal Vref can be sent to the driving and sensing line 13L1. Through the selection by the signal selection switch circuit 1732, the capacitance detection signal 176 can be sent to the driving and sensing line 13L2. Through the selection by the signal selection switch circuit 1733, the amplified capacitance detection signal 177 can be sent to the driving and sensing line 13L3. Meanwhile, through one of the driving and sensing lines 150, a sensing signal 178 is inputted to the self-capacitance detection circuit 171; that is, as shown in FIG. 6, the capacitance sensing signal 178 is sent to the self-capacitance detection circuit 171 through the driving and sensing line 13L2.

Figure 7A:
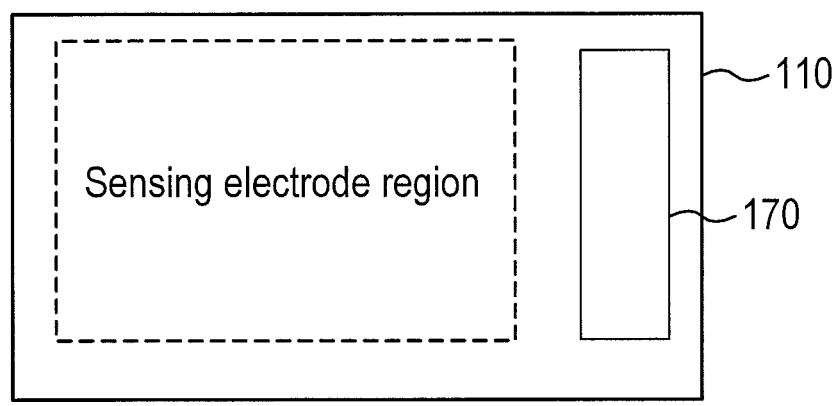
FIGS. 7A to 7C are the schematic diagrams illustrating the relation between the integrated circuit chip and the sensing electrode substrate according to the present invention.
Figure 7B:
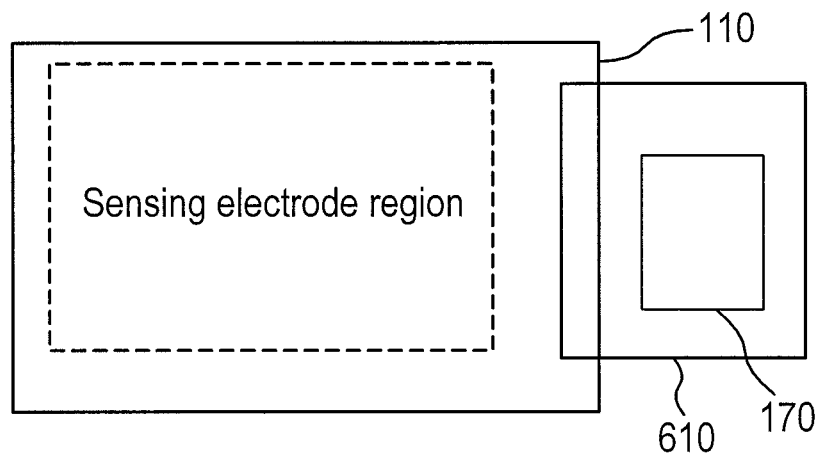
Figure 7C:
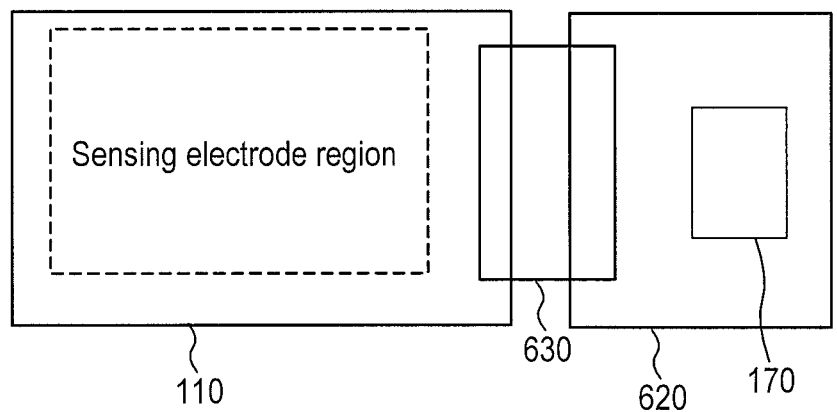

FIGS. 7A to 7C are the schematic diagrams illustrating the relation between the integrated circuit chip 170 and the sensing electrode substrate 110 according to the present invention. In FIG. 7A, the integrated circuit chip 170 is adhered on the sensing electrode substrate 110. In FIG. 7B, the integrated circuit chip 170 is adhered on a flexible circuit board 610, and the flexible circuit board 610 is then adhered on the sensing electrode substrate 110, so that the integrated circuit chip 170 can be electrically connected to the sensing electrode substrate 110. In FIG. 7C, the integrated circuit chip 170 is adhered on a circuit board 620, the circuit board 620 is then electrically connected to the sensing electrode substrate 110 through a flexible flat cable 630.

Figure 8A:
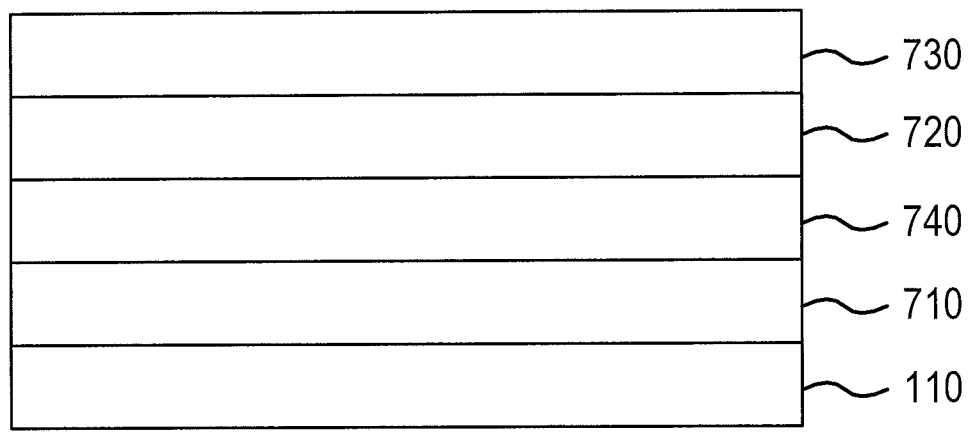
FIGS. 8A to 8D are the stack diagrams of the 1-to-N switch circuits, the sensing electrodes and the wires according to the present invention.

FIGS. 8A to 8D are the stack diagrams of the 1-to-N switch circuits 120, the sensing electrode 130 and the wires 140 according to the present invention. In this embodiment, the 1-to-N switch circuits 120 and the wires 140 are arranged in a thin film transistor switch and wire layer 710, and the sensing electrodes 130 are arranged in a sensing electrode layer 720. As shown in FIG. 8A, a protection layer 730 is provided on the sensing electrode layer 720. A first shielding electrode layer 740 is provided between the thin film transistor switch and wire layer 710 and the sensing electrode layer 720 for preventing the signals in the thin film transistor switch and wire layer 710 from interfering the sensing electrodes 130 in the sensing electrode layer 720. That is, the first shielding electrode layer 740 is provided between the sensing electrodes 130, and the driving and sensing lines 150 and the control lines 160.

Figure 8B:
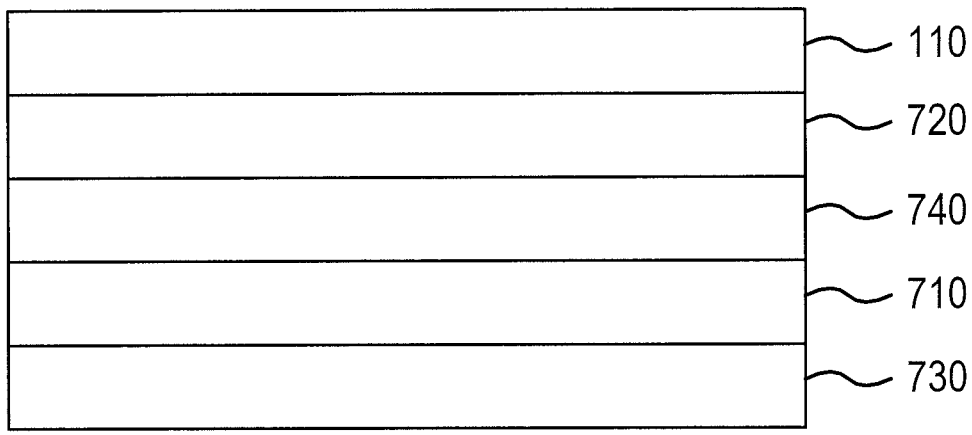
Figure 8C:
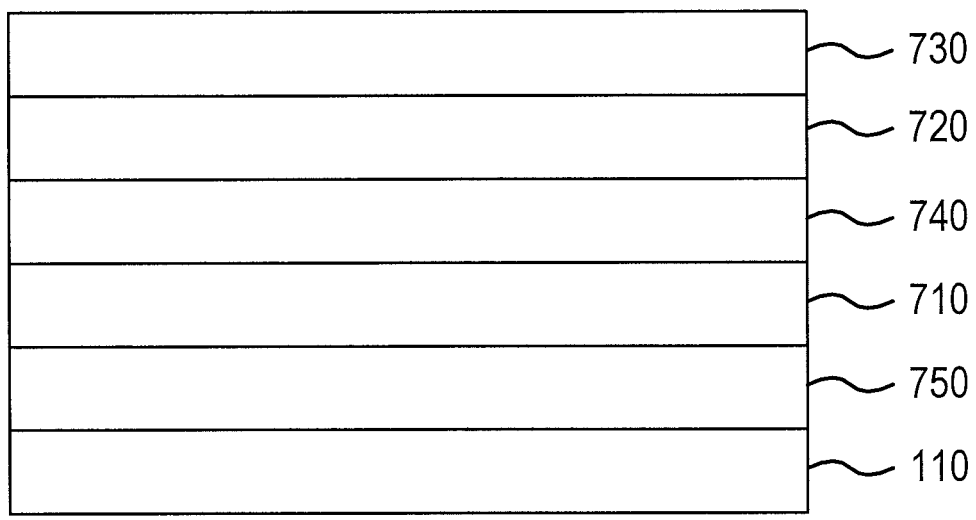
Figure 8D:
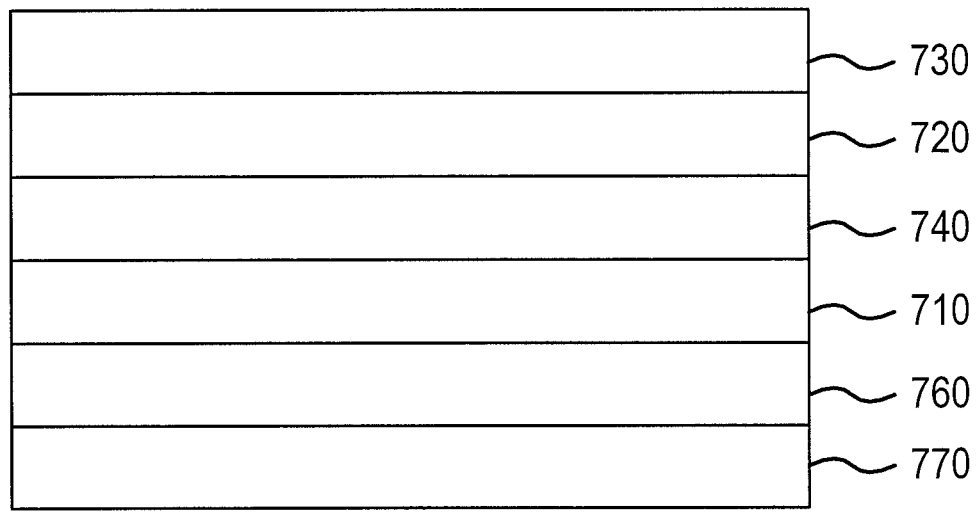

The sensing electrode substrate 110 is provided under the thin film transistor switch and wire layer 710. FIG. 8B is similar to FIG. 8A except that the protection layer 730 and the sensing electrode substrate 110 interchange their locations. FIG. 8C is similar to FIG. 8A except that there is a second shielding layer 750 provided between the thin film transistor switch and wire layer 710 and the sensing electrode substrate 110. FIG. 8D is similar to FIG. 8C except that there are an insulating layer 760 and a metal sensing electrode substrate 770 provided on the surface of the thin film transistor switch and wire layer 710 that is opposite to the sensing electrode substrate 110.

Figure 9:
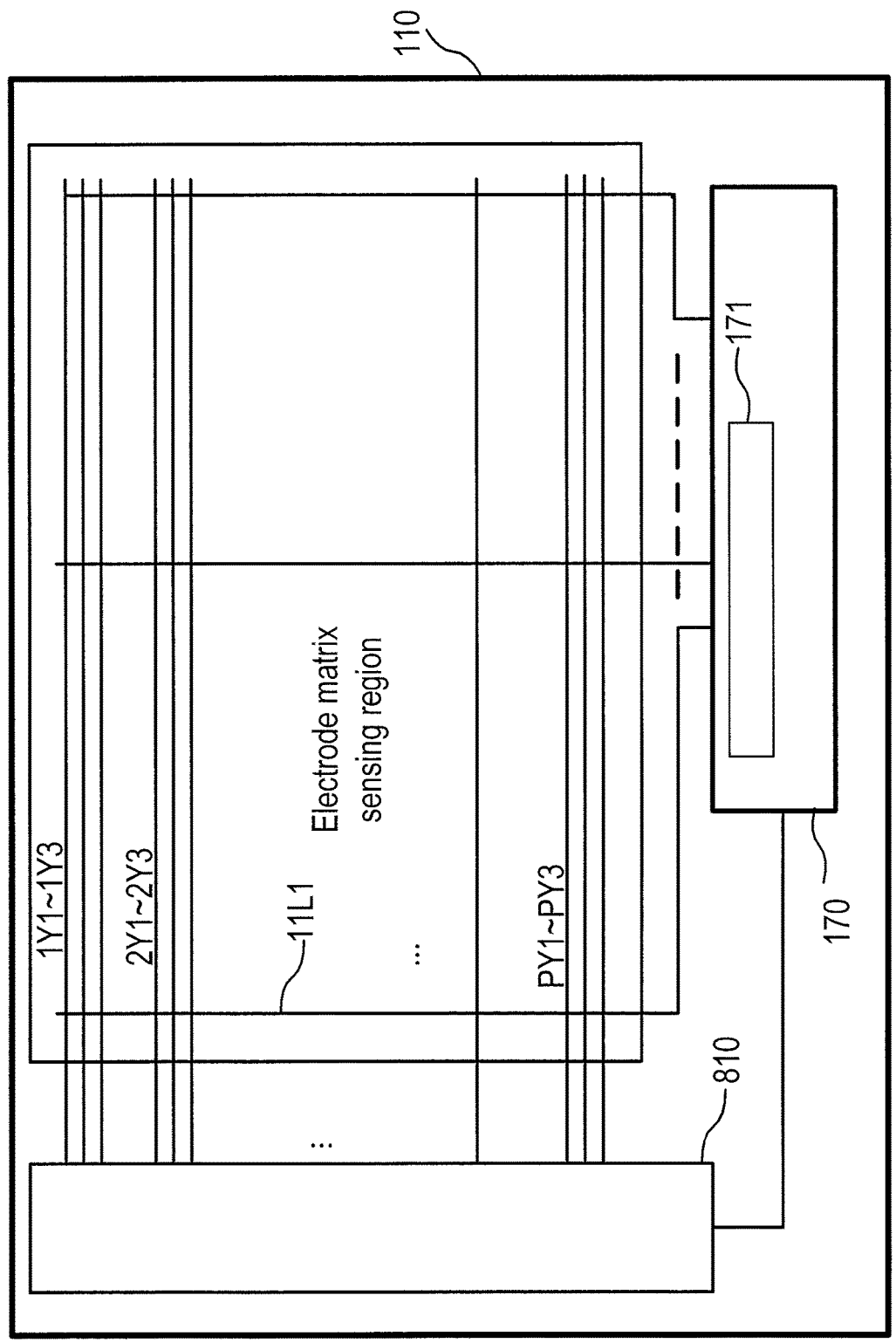
FIG. 9 is the schematic diagram of another high-efficiency fingerprint identification device according to the present invention.

FIG. 9 is the schematic diagram of another high-efficiency fingerprint identification device 100 according to the present invention. The high-efficiency fingerprint identification device 100 further includes a control circuit 810 disposed on the sensing electrode substrate 110 and having an output connected to the control lines 1Y1 to 1Y3, 2Y1 to 2Y3, . . . , and PY1 to PY3. The control circuit 810 is preferably a shift register circuit. The shift register circuit performs a least two-bit shifting, such that the control circuit 810 controls the sensing electrodes 130 in each row to be electrically connected to which of the driving and sensing lines 11L1 to 11L3, 12L1 to 12L3, . . . , and 1nL1 to 1nL3 through the control lines 1Y1 to 1Y3, 2Y1 to 2Y3, . . . , and PY1 to PY3.

Figure 10:
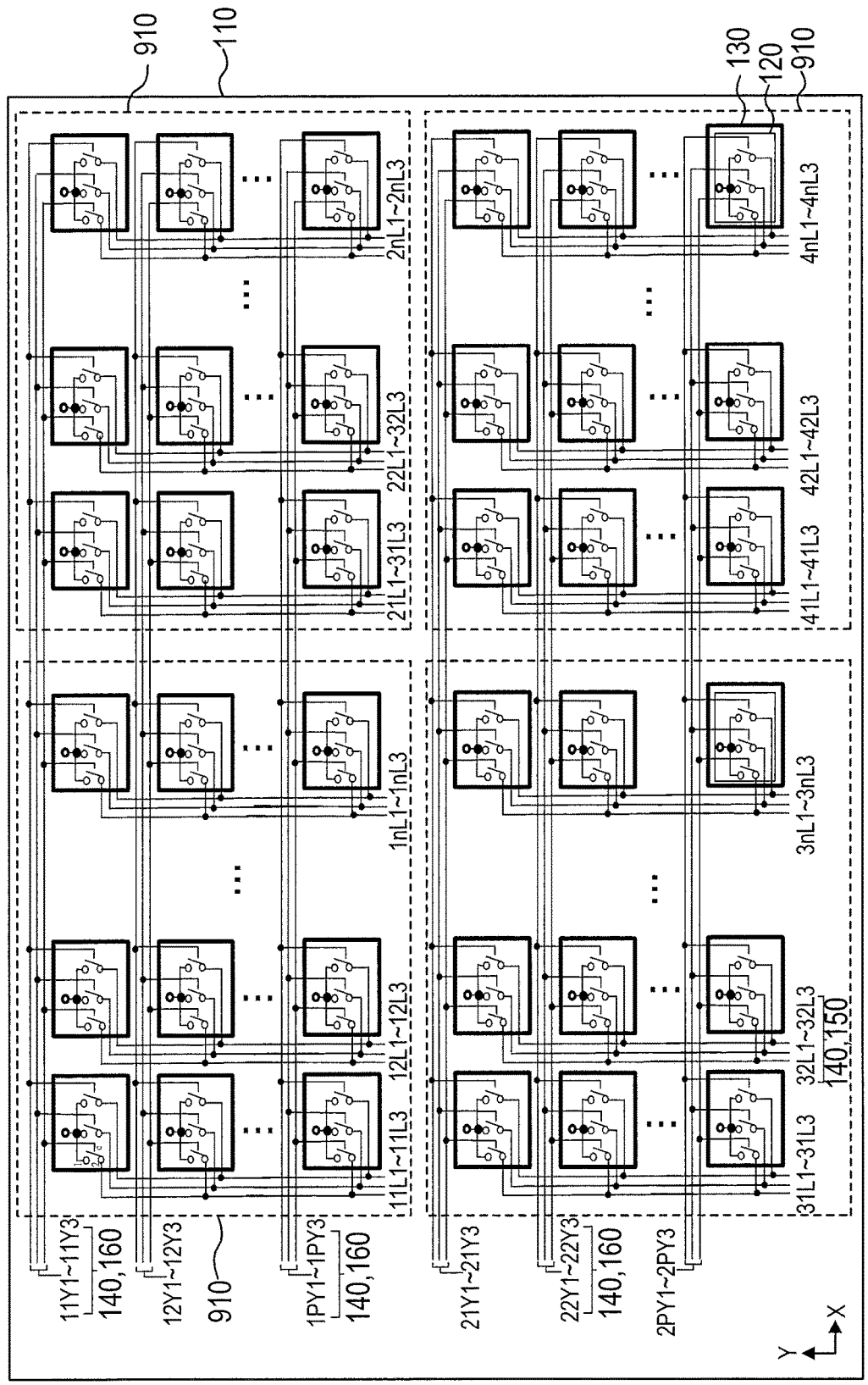
FIG. 10 is the top view of still another high-efficiency fingerprint identification device according to the present invention.

FIG. 10 is the top view of still another high-efficiency fingerprint identification device 100 according to the present invention. As shown in FIG. 10, the high-efficiency fingerprint identification device 100 includes a sensing electrode substrate 110 and at least two sensing electrode regions 910. In this embodiment, there are four sensing electrode regions 910. Each sensing electrode region 910 includes a plurality of 1-to-N switch circuits 120, a plurality of sensing electrodes 130, a plurality of wires 140 (which are divided into driving and sensing lines 150 and control lines 160), and an integrated circuit chip 170 (shown in FIG. 15).

FIG. 10 is similar to FIG. 1; that is, in a sensing electrode region 910, the 1-st second ends (b1) of the 1-to-N switch circuits in the same column are electrically connected to each other, the 2-nd second ends (b2) of the 1-to-N switch circuits 120 in the same column are electrically connected to each other, the 3-rd second ends (b3) of the 1-to-N switch circuits 120 in the same column are electrically connected to each other, and so on as to the N-th second ends. As shown in FIG. 10, each 1-to-N switch circuit 120 is a 1-to-3 switch circuit.

Figure 11:
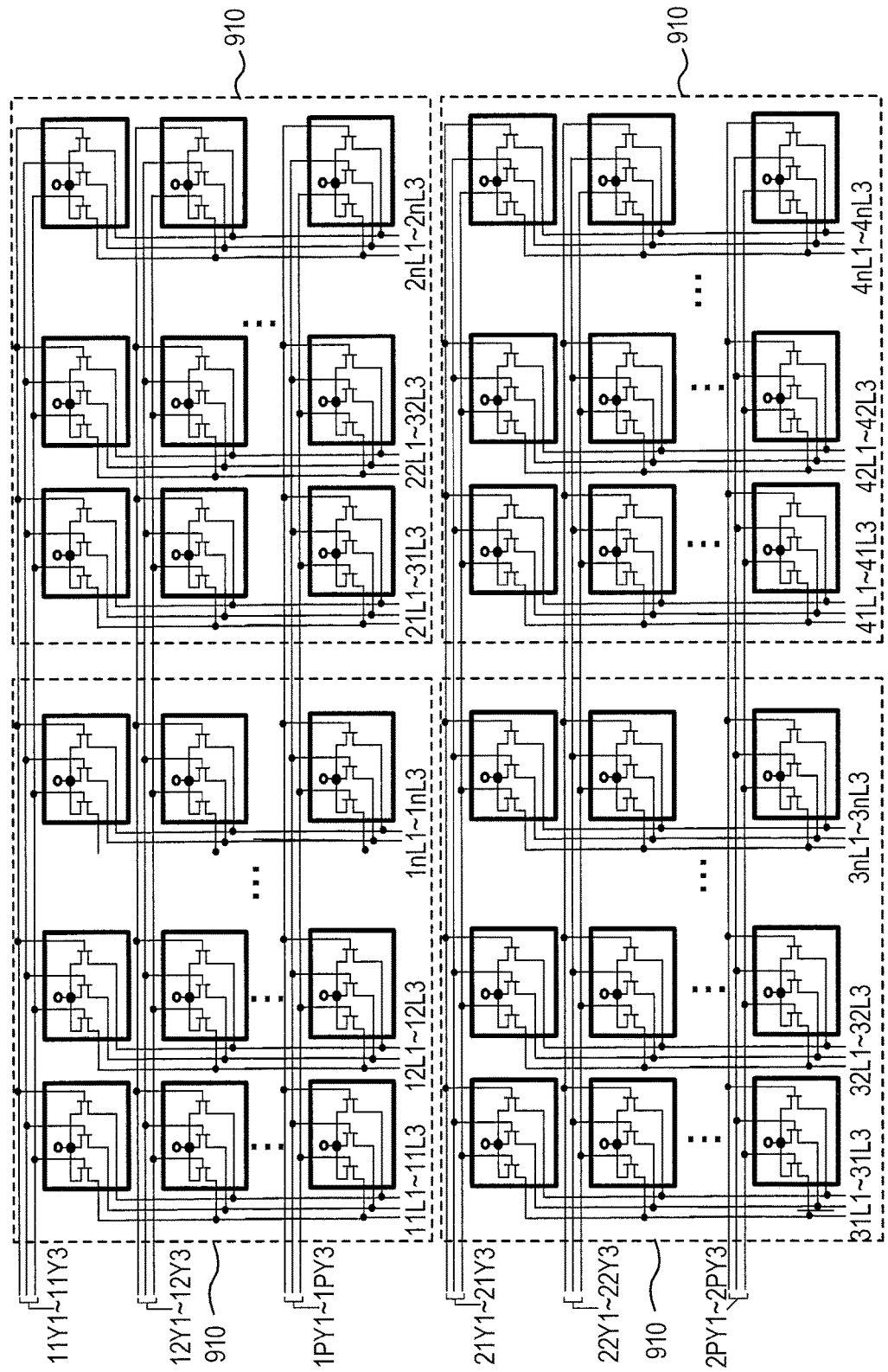
FIG. 11 is the schematic diagram of FIG. 10 according to the present invention.

FIG. 11 is the schematic diagram of FIG. 10 according to the present invention. In FIG. 11, each 1-to-3 switch circuit is implemented by a thin film transistor.

Figure 12:
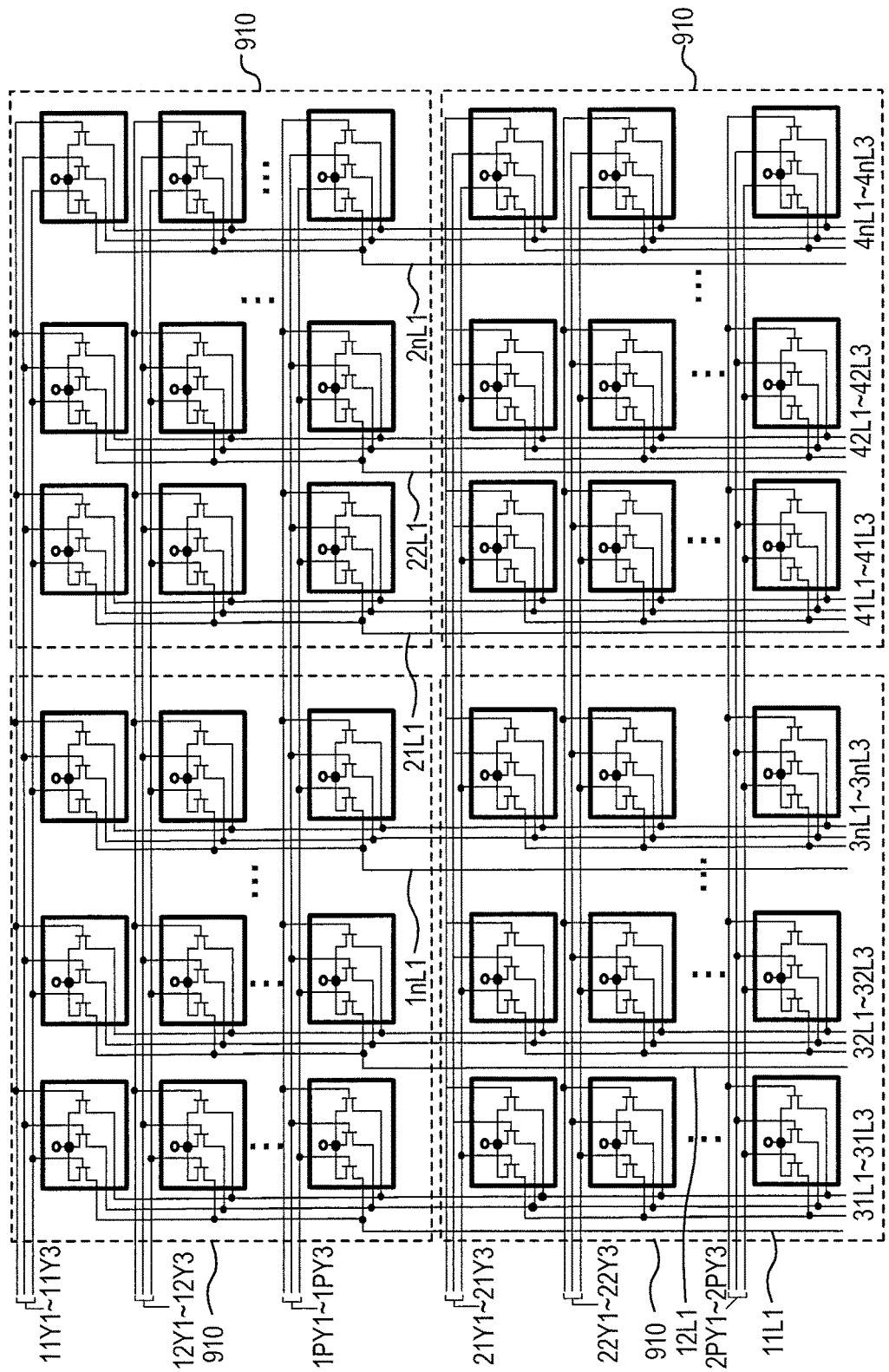
FIG. 12 is the top view of yet another high-efficiency fingerprint identification device according to the present invention.

FIG. 12 is the top view of yet another high-efficiency fingerprint identification device 100 according to the present invention. FIG. 12 is similar to FIG. 11 except that, in FIG. 12, the driving and sensing lines 11L2, 11L3 are electrically connected to the driving and sensing lines 31L2, 31L3, respectively, and the two driving and sensing lines 11L2, 11L3 are also presented by the notation 31L2, 31L3, respectively. That is, some driving and sensing lines in the sensing electrode regions in the same column are electrically connected to each other. Similarly, the driving and sensing lines 1nL2, 1nL3 are electrically connected to the driving and sensing lines 3nL2, 3nL3, respectively, and the two driving and sensing lines 1nL2, 1nL3 are also presented by the notation 3nL2, 3nL3, respectively. The driving and sensing lines 2nL2, 2nL3 are electrically connected to the driving and sensing lines 4nL2, 4nL3, respectively, and the two driving and sensing lines 2nL2, 2nL3 are also presented by the notation 4nL2, 4nL3, respectively. In FIG. 12, the capacitance detection signal 176 can be applied on the top-left sensing electrode region through the driving and sensing line 11L1, and the capacitance detection signal 176 can be applied on the bottom-left sensing electrode region through the driving and sensing line 31L1. Thus, the top sensing electrode region and the bottom sensing electrode region can perform the detection simultaneously.

Figure 13:
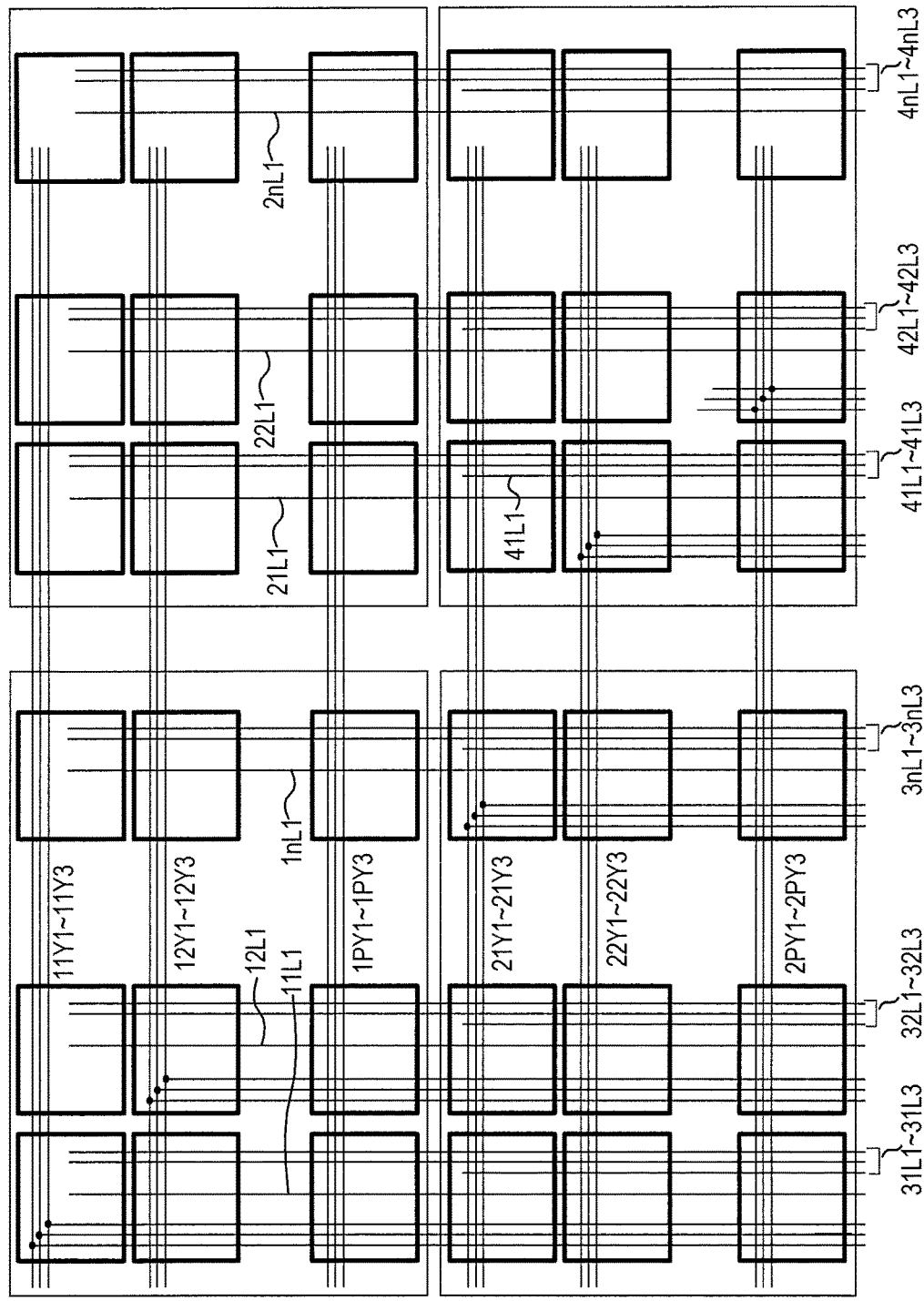
FIG. 13 is the schematic diagram of the control lines and the driving and sensing lines according to the present invention.

FIG. 13 is the schematic diagram of the control lines 160 and the driving and sensing lines 150 according to the present invention. As shown in FIG. 13, the m control lines 160 extend along the first direction until reaching their corresponding rows, and then extend along the second direction. The control lines 11Y1 to 11Y3 are electrically connected to the 1-to-3 switch circuits 120 corresponding to the sensing electrodes 130 in the first row. Thus, the control lines 11Y1 to 11Y3 extend along the second direction and extend across the sensing electrode 13 in the first row. The driving and sensing line 21L1 is connected to the sensing electrodes 130 in the same row in the top-right sensing electrode region. The driving and sensing line 41L1 is connected to the sensing electrodes 130 in the same row in the bottom-right sensing electrode region. Thus, the driving and sensing line 41L1 is not necessary to extend into the top-right sensing electrode region.

Figure 14:
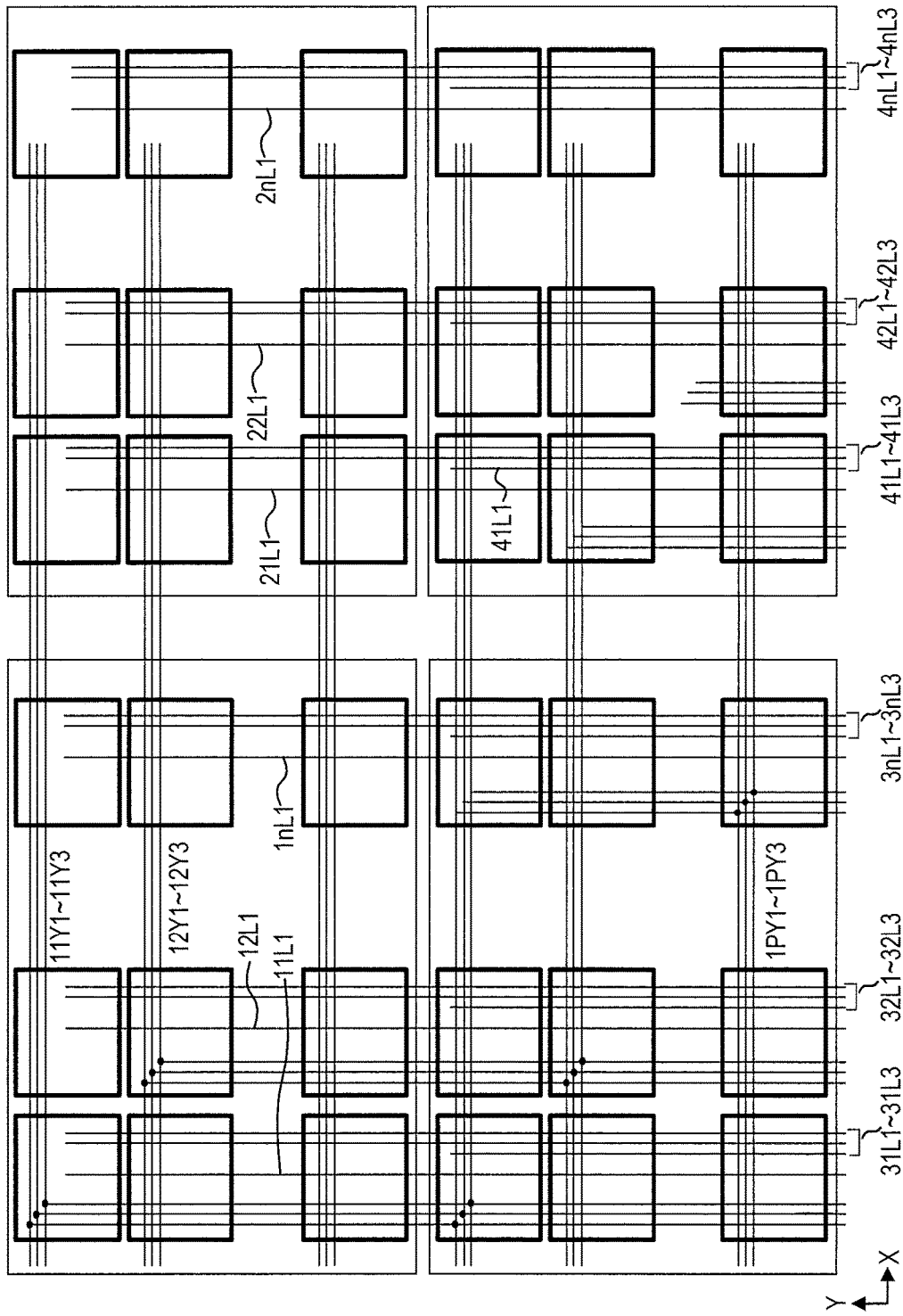
FIG. 14 is the schematic diagram of still another control lines and driving and sensing lines according to the present invention.

FIG. 14 is the schematic diagram of still another control lines 160 and driving and sensing lines 150 according to the present invention. As shown in FIG. 14, the sensing electrodes of the first row in the top-left sensing electrode region, the bottom-left sensing electrode region, the top-right sensing electrode region and the bottom-right sensing electrode region are connected to the control lines 11Y1 to 11Y3, so that the first ends (a) of the 1-to-3 switch circuits 120 can be controlled to be connected to which of the three second ends (b1), (b2), (b3). Accordingly, the area for disposing the control lines 160 along the first direction can be reduced.

Figure 15:
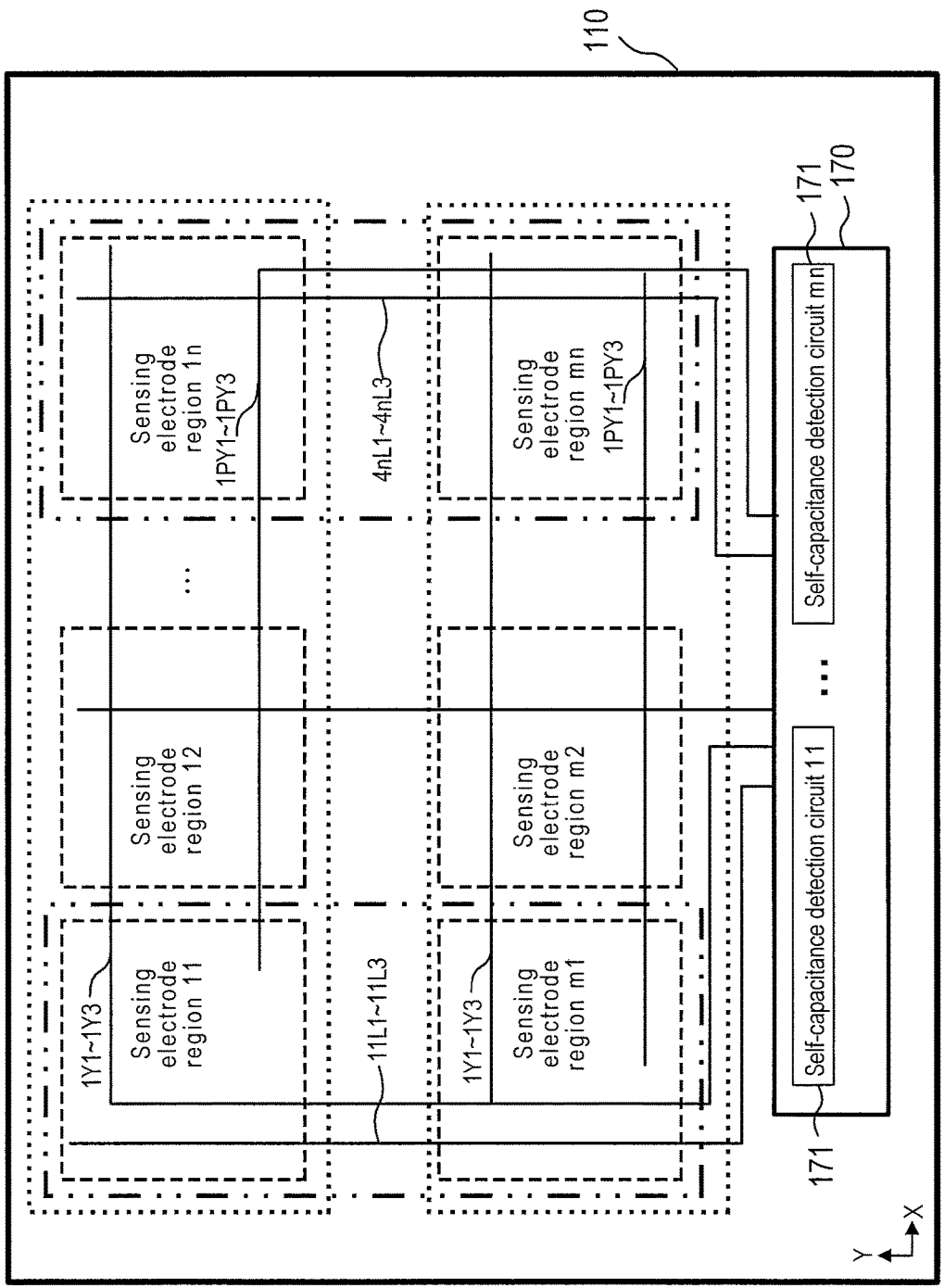
FIG. 15 is the schematic diagram of still another high-efficiency fingerprint identification device according to the present invention.

FIG. 15 is the schematic diagram of still another high-efficiency fingerprint identification device 100 according to the present invention, in which the integrated circuit chip 170 is adhered on the sensing electrode substrate 110. The sensing electrodes 130 on the sensing electrode substrate 110 are divided into m×n sensing electrode regions. That is, there are sensing electrode regions in m rows and sensing electrode regions in n columns on the sensing electrode substrate 110. The integrated circuit chip 170 has m×n self-capacitance detection circuits 171. Each self-capacitance detection circuit 171 is corresponding to a sensing electrode region. That is, the number of the self-capacitance detection circuits 171 is not less than the number of the sensing electrode regions. The detailed circuit of the integrated circuit chip 170 can be referred to FIG. 6. That is, the integrated circuit chip 170 further includes a plurality of signal selection switch circuits 173, and through the selection by the signal selection switch circuits 173, the relevant capacitance detection signals (the capacitance detection signal 176, the amplified capacitance detection signal 177 and the reference voltage signal Vref) are sent to the at least one driving and sensing line 11L1 to 11L3, 12L1 to 12L3, 13L1 to 13L3, . . . , and 4nL1 to 4nL3 corresponding to the sensing electrodes 130 in each column.

Figure 16:
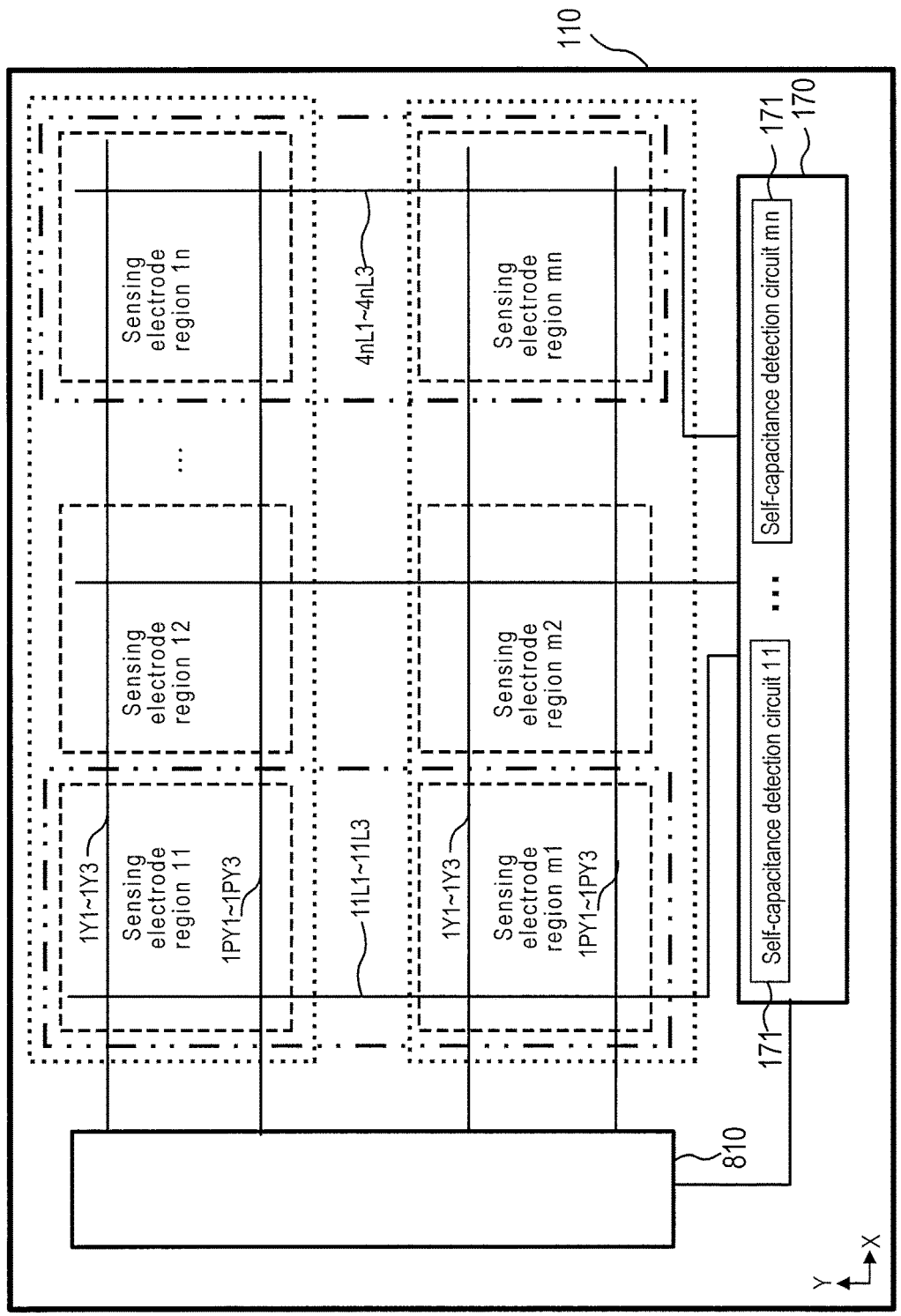
FIG. 16 is the schematic diagram of yet another high-efficiency fingerprint identification device according to the present invention.

FIG. 16 is the schematic diagram of yet another high-efficiency fingerprint identification device 100 according to the present invention. The high-efficiency fingerprint identification device 100 further includes a control circuit 810 disposed on the sensing electrode substrate 110 and having an output connected to the control lines 1Y1 to 1Y3, 2Y1 to 2Y3, . . . , and PY1 to PY3. The control circuit 810 is preferably a shift register circuit. The shift register circuit performs a least two-bit shifting, such that the control circuit 810 controls the sensing electrodes in each row to be electrically connected to which of the driving and sensing lines 11L1 to 1L3, 12L1 to 12L3, . . . , and 1nL1 to 1nL3 through the control lines 1Y1 to 1Y3, 2Y1 to 2Y3, . . . , and PY1 to PY3.

Figure 17:
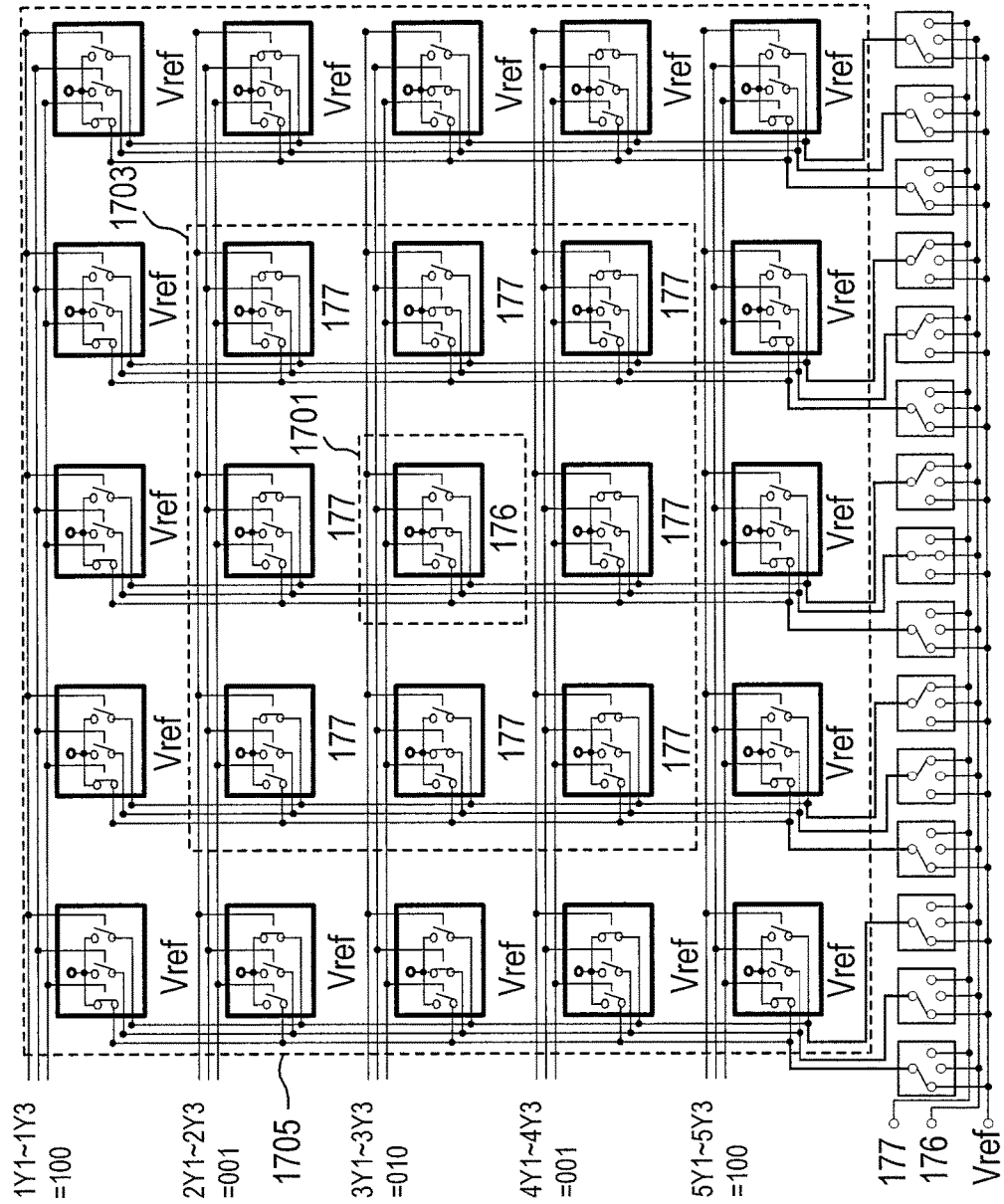
FIG. 17 shows an operation diagram of the high-efficiency fingerprint identification device according to the present invention.

FIG. 17 shows an operation diagram of the high-efficiency fingerprint identification device 100 according to the present invention, which is based on the configurations in FIG. 2. As shown in FIG. 17, by setting the control lines 1Y1 to 1Y3, 2Y1 to 2Y3, . . . , and 5Y1 to 5Y3 and the signal selection switch circuits 173, there can be only one sensing electrode 130 formed thereon a sensing region 1701 with capacitance detection signal 176. There is a deflection focusing region 1703 out of the sensing region 1701. The deflection focusing region 1703 has eight sensing electrodes 130. Each sensing electrode 130 has an amplified capacitance detection signal 177. There is a convergence stabilizing region 1705 out of the deflection focusing region 1703. The convergence stabilizing region 1705 has sixteen sensing electrodes 130. Each sensing electrode 130 has a reference voltage signal Vref.

Figure 18:
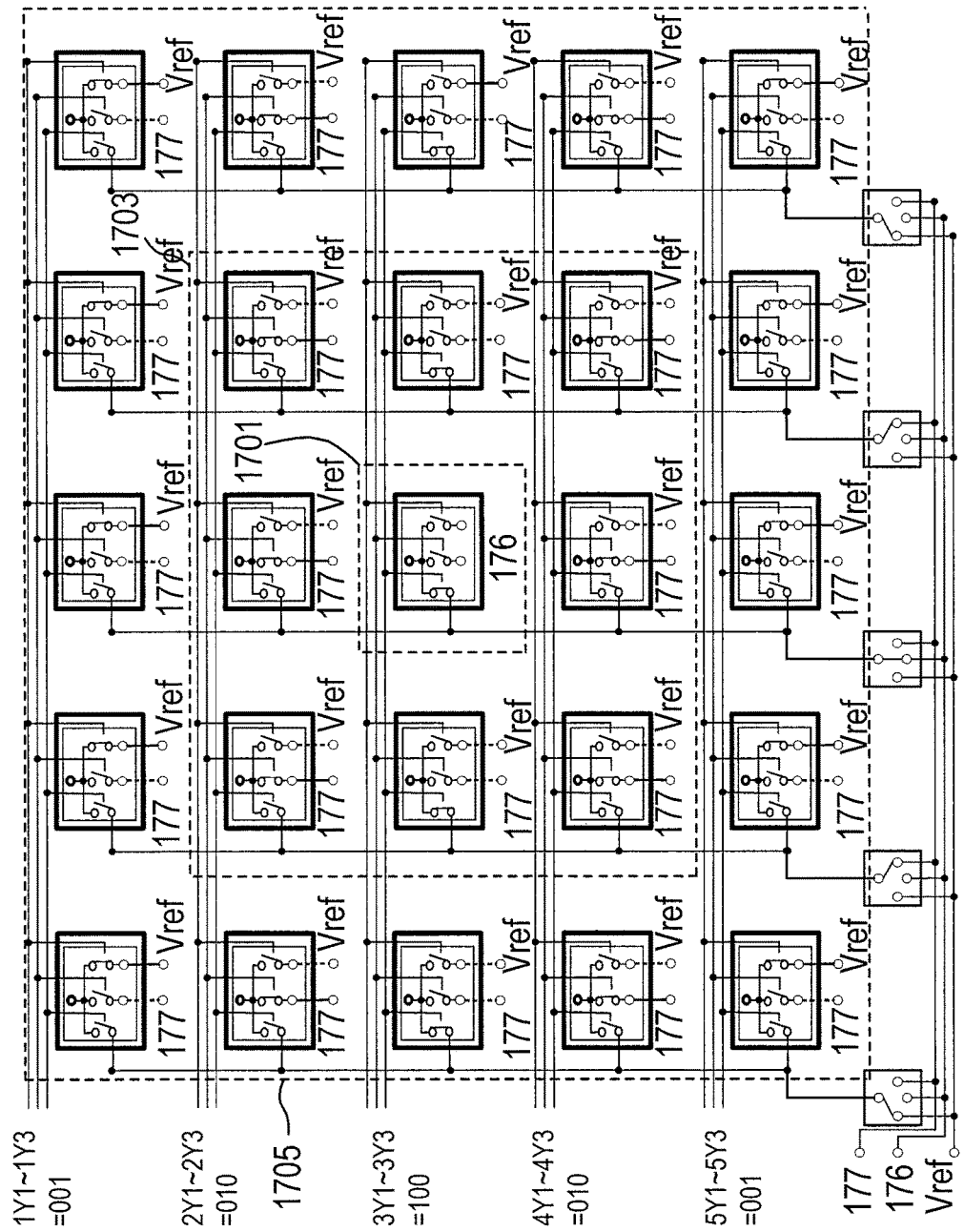
FIG. 18 shows another operation diagram of the high-efficiency fingerprint identification device according to the present invention.

FIG. 18 shows another operation diagram of the high-efficiency fingerprint identification device 100 according to the present invention, which is based on the configurations in FIGS. 1 and 8C. As shown in FIG. 18, the 2-nd second end (b2) of the 1-to-3 switch circuit 120 is connected to a first shielding electrode layer 740 through a via hole (via2), and the 3-rd second ends (b3) of the 1-to-3 switch circuit 120 is connected to a second shielding electrode layer 750 through a via hole (via3). The first shielding electrode layer 740 is connected to the amplified capacitance detection signal 177, and the second shielding electrode layer 750 is connected to the reference voltage signal Vref. By setting the control lines 1Y1 to 1Y3, 2Y1 to 2Y3, . . . , and 5Y1 to 5Y3 and the signal selection switch circuits 173, there can be only one sensing electrode 130 formed thereon a sensing region 1701 with capacitance detection signal 176. Each of the ten sensing electrodes 130 in the first row and the fifth row has a reference voltage signal Vref. The wires connected to the amplified capacitance detection signal 177 are shown by dash lines. Each of the ten sensing electrodes 130 in the second row and the fourth row has an amplified capacitance detection signal 177. The wires connected to the reference voltage signal are shown by dash lines.

In view of the above, it is known that the present invention can use the control lines 1Y1 to 1Y3, 2Y1 to 2Y3, . . . , and 5Y1 to 5Y3 and the signal selection switch circuits 173 to sequentially or dynamically select at least one electrode 130 as a sensing region 1701 from the sensing electrodes 130 in each electrode sensing region, so as to configure the sensing electrodes 130 surrounding the sensing region 1701 to be a corresponding deflection focusing region 1703, and configure the sensing electrodes 130 surrounding the deflection focusing region 1703 to be a corresponding convergence stabilizing region 1705, thereby gathering and pulling up the electric flux lines from the sensing electrode 130 in the sensing region 1701. Thus, it can enhance the sensing sensitivity, stability and accuracy, increase the sensing distance, improve the signal-noise ratio, and reduce the cost of fingerprint identification device.

Although the present invention has been explained in relation to its preferred embodiment, it is to be understood that many other possible modifications and variations can be made without departing from the spirit and scope of the invention as hereinafter claimed.

What is claimed is:

1. A high-efficiency fingerprint identification device, comprising:
a sensing electrode substrate;
a plurality of 1-to-N switch circuits formed on the sensing electrode substrate, each 1-to-N switch circuit having a first end, N second ends and m control ends, the m control ends controlling connection between the first end and the N second ends, where m is an integer greater than or equal to 2, and N is an integer greater than or equal to 3;
a plurality of sensing electrodes arranged along a first direction and a second direction for forming an electrode matrix with columns and rows, the first direction being substantially perpendicular to the second direction, wherein each sensing electrode is corresponding to a nearby 1-to-N switch circuit, the i-th second ends of the 1-to-N switch circuits corresponding to the sensing electrodes in each column are electrically connected to each other, and one of the N second ends is electrically connected to its corresponding sensing electrode, where 1≤i≤N; and
a plurality of wires divided into driving and sensing lines and control lines, wherein the sensing electrodes in each column are corresponding to at least one driving and sensing line, the at least one driving and sensing line is electrically connected to one of the N second ends of the 1-to-N switch circuits corresponding to the sensing electrodes in the column, the sensing electrodes in each row are corresponding to m control lines, and each control line is electrically connected to ones of the m control ends of the 1-to-N switch circuits corresponding to the sensing electrodes in the row, wherein the driving and sensing lines carry at least a reference voltage and a sensing signal, and the control lines carry at least a control signal.

2. The high-efficiency fingerprint identification device as claimed in claim 1, further comprising an integrated circuit chip including at least one self-capacitance detection circuit, and electrically connected to the at least one driving and sensing line.

3. The high-efficiency fingerprint identification device as claimed in claim 2, wherein the integrated circuit chip further includes a plurality of signal selection switch circuits, and sends relevant capacitance detection signals to the at least one driving and sensing line corresponding to the sensing electrodes in each column through selection by the signal selection switch circuits.

4. The high-efficiency fingerprint identification device as claimed in claim 2, wherein the integrated circuit chip is electrically connected to the m control lines, and the m control lines extend along the first direction until reaching their corresponding rows and then extend along the second direction.

5. The high-efficiency fingerprint identification device as claimed in claim 2, wherein the integrated circuit chip is adhered on the sensing electrode substrate.

6. The high-efficiency fingerprint identification device as claimed in claim 1, further comprising a shielding electrode layer disposed between the sensing electrodes, and the at least one driving and sensing line and the control lines.

7. The high-efficiency fingerprint identification device as claimed in claim 1, further comprising a control circuit disposed on the sensing electrode substrate and having an output connected to the control lines.

8. The high-efficiency fingerprint identification device as claimed in claim 7, wherein the control circuit is a shift register circuit for executing at least two-bit shifting.

9. The high-efficiency fingerprint identification device as claimed in claim 7, further comprising an integrated circuit chip including at least one self-capacitance detection circuit, and electrically connected to the at least one driving and sensing line and the control circuit, so as to allow the control circuit to control the sensing electrodes in each row to be electrically connected to which of the at least one driving and sensing line through the control lines.

10. The high-efficiency fingerprint identification device as claimed in claim 7, wherein the integrated circuit chip further includes a plurality of signal selection switch circuits, and sends relevant capacitance detection signals to the at least one driving and sensing line corresponding to the sensing electrodes in each column through selection by the signal selection switch circuits, so as to input a sensing signal to the self-capacitance detection circuit through one of the at least one driving and sensing line.

11. A high-efficiency fingerprint identification device, comprising:
a sensing electrode substrate; and
at least two sensing electrode regions on the sensing electrode substrate, each sensing electrode region including:
a plurality of 1-to-N switch circuits formed on the sensing electrode substrate, each 1-to-N switch circuit having a first end, N second ends and m control ends, the m control ends controlling connection between the first end and the N second ends, wherein m is an integer greater than or equal to 2, and N is an integer greater than or equal to 3;
a plurality of sensing electrodes arranged along a first direction and a second direction for forming an electrode matrix with columns and rows, the first direction being substantially perpendicular to the second direction, wherein each sensing electrode is corresponding to a nearby 1-to-N switch circuit, the i-th second ends of the 1-to-N switch circuits corresponding to the sensing electrodes in each column are electrically connected to each other, and one of the N second ends is electrically connected to its corresponding sensing electrode, where 1≤i≤N; and
a plurality of wires divided into driving and sensing lines and control lines passing through the sensing electrodes in each row and the sensing electrodes in each column, respectively, in each sensing electrode region, wherein the sensing electrodes in each column are corresponding to at least one driving and sensing line, the at least one driving and sensing line is electrically connected to one of the N second ends of the 1-to-N switch circuits corresponding to the sensing electrodes in the column, the sensing electrodes in each row are corresponding to m control lines, and each control line is electrically connected to ones of the m control ends of the 1-to-N switch circuits corresponding to the sensing electrodes in the row, wherein the driving and sensing lines carry at least a reference voltage and a sensing signal, and the control lines carry at least a control signal.

12. The high-efficiency fingerprint identification device as claimed in claim 11, wherein some of the driving and sensing lines in the sensing electrode regions in the same column are electrically connected to each other.

13. The high-efficiency fingerprint identification device as claimed in claim 11, further comprising an integrated circuit chip including a plurality of self-capacitance detection circuits, and electrically connected to the at least one driving and sensing line.

14. The high-efficiency fingerprint identification device as claimed in claim 13, wherein a number of the self-capacitance detection circuits is not less than that of the sensing electrode regions.

15. The high-efficiency fingerprint identification device as claimed in claim 13, wherein the integrated circuit chip further includes a plurality of signal selection switch circuits, and sends relevant capacitance detection signals to the at least one driving and sensing line corresponding to the sensing electrodes in each column through selection by the signal selection switch circuits.

16. The high-efficiency fingerprint identification device as claimed in claim 13, wherein the integrated circuit chip is electrically connected to the m control lines, and the m control lines extend along the first direction until reaching their corresponding rows and then extend along the second direction.

17. The high-efficiency fingerprint identification device as claimed in claim 13, wherein the integrated circuit chip is adhered on the sensing electrode substrate.

18. The high-efficiency fingerprint identification device as claimed in claim 11, further comprising a shielding electrode layer disposed between the sensing electrodes, and the at least one driving and sensing line and the control lines.

19. The high-efficiency fingerprint identification device as claimed in claim 11, further comprising a control circuit disposed on the sensing electrode substrate and having an output connected to the control lines.

20. The high-efficiency fingerprint identification device as claimed in claim 19, wherein the control circuit is a shift register circuit for executing at least two-bit shifting.

21. The high-efficiency fingerprint identification device as claimed in claim 20, further comprising an integrated circuit chip including a plurality of self-capacitance detection circuits, and electrically connected to the at least one driving and sensing line and the control circuit, so as to allow the control circuit to control the sensing electrodes in each raw to be electrically connected to which of the driving and sensing lines through the control lines.

22. The high-efficiency fingerprint identification device as claimed in claim 21, wherein a number of the self-capacitance detection circuits is not less than that of the sensing electrode regions.

23. The high-efficiency fingerprint identification device as claimed in claim 21, wherein the integrated circuit chip further includes a plurality of signal selection switch circuits, and sends relevant capacitance detection signals to the at least one driving and sensing line corresponding to the sensing electrodes in each column through selection by the signal selection switch circuits, so as to input a sensing signal to the self-capacitance detection circuit through one of the at least one driving and sensing line.

* * * * *